US012668189B2

(12) United States Patent 
Miwa et al.

(10) Patent No.: US 12,668,189 B2 
(45) Date of Patent: Jun. 30, 2026

(54) VEHICLE STEP DEVICE

(71) Applicant: AISIN CORPORATION, Kariya (JP)

(72) Inventors: Masashi Miwa, Fujisawa (JP); Takanori Yasutake, Fujisawa (JP)

(73) Assignee: AISIN CORPORATION, Kariya (JP)

( * ) Notice: Subject to any disclaimer, the term of this patent is extended or adjusted under 35 U.S.C. 154(b) by 296 days.

(21) Appl. No.: 18/693,030

(22) PCT Filed: Oct. 28, 2022

(86) PCT No.: PCT/JP2022/040293 
§ 371 (c)(1), 
(2) Date: Mar. 18, 2024

(87) PCT Pub. No.: WO2023/074832 
PCT Pub. Date: May 4, 2023

(65) Prior Publication Data 
US 2024/0383407 A1 Nov. 21, 2024

(30) Foreign Application Priority Data

Oct. 29, 2021 (JP) ................................. 2021-177558 
Jun. 23, 2022 (JP) ................................. 2022-101115

(51) Int. Cl. 
*B60R 3/02* (2006.01) 
(52) U.S. Cl. 
CPC ..................................... *B60R 3/02* (2013.01) 
(58) Field of Classification Search 
CPC ...................................................... B60R 3/02 
See application file for complete search history.

(56) References Cited

U.S. PATENT DOCUMENTS

| | | | | |
|---|---|---|---|---|
| 2016/0023609 A1* | 1/2016 | Watson | ................... | B60R 3/002 |
| | | | | 280/166 |
| 2017/0174138 A1* | 6/2017 | Fortin | ........................ | B60R 3/02 |
| 2017/0210299 A1* | 7/2017 | Watson | ..................... | B60R 3/02 |
| 2018/0001825 A1* | 1/2018 | Long | .................... | B61D 23/025 |
| 2019/0084482 A1* | 3/2019 | Long | ........................ | B60R 3/002 |
| 2019/0308558 A1* | 10/2019 | Long | ......................... | B60R 3/02 |
| 2020/0339039 A1* | 10/2020 | Watson | .................. | B60R 3/002 |
| 2021/0323480 A1* | 10/2021 | Long | ......................... | B60R 3/02 |

FOREIGN PATENT DOCUMENTS

| | | | |
|---|---|---|---|
| JP | 2014-104801 A | | 6/2014 |
| JP | 2019094038 A | * | 6/2019 |

OTHER PUBLICATIONS

International Search Report mailed on Dec. 27, 2022 in PCT/JP2022/040293 filed on Oct. 28, 2022, 2 pages.

* cited by examiner

*Primary Examiner* — Alexander K Garlen 
(74) *Attorney, Agent, or Firm* — Oblon, McClelland, Maier & Neustadt, L.L.P.

(57) ABSTRACT

A vehicle step device is provided at a vehicle body. The vehicle step device includes an arm attached to the vehicle body or a base fixed to the vehicle body, a step attached to the arm, and a drive unit configured in such a way as to drive the arm. The drive unit includes an expansion-contraction unit. The expansion-contraction unit includes a body portion and a movement portion configured in such a way as to move relative to the body portion. In a state where the vehicle step device is attached to the vehicle body, the movement portion is connected to the arm in such a way that the expansion-contraction unit expands and contracts in a front-rear direction of the vehicle body.

12 Claims, 14 Drawing Sheets

VEHICLE STEP DEVICE

TECHNICAL FIELD

The present disclosure relates to a vehicle step device.

BACKGROUND ART

Patent Literature 1 discloses a vehicle step device. In the vehicle step device, a step moves in a vehicle width direction. The step is moved by a drive unit. The drive unit includes a sector gear. The sector gear transmits power of a motor to an arm.

CITATION LIST

Patent Literature

Patent Literature 1: JP2014-104801A

BRIEF SUMMARY

Technical Problem

In a case of a conventional vehicle step device, a space for movement of the sector gear needs to be secured, and thus, a width of the step device is not easily shortened in a width direction. In this regard, there is room for improvement concerning a size in the vehicle width direction.

Solution to Problem

A vehicle step device according to one aspect of the present disclosure is provided at a vehicle body. The vehicle step device includes an arm attached to the vehicle body or a base fixed to the vehicle body, a step attached to the arm, and a drive unit configured in such a way as to drive the arm. The drive unit includes an expansion-contraction unit. The expansion-contraction unit includes a body portion and a movement portion configured in such a way as to move relative to the body portion. In a state where the vehicle step device is attached to the vehicle body, the movement portion is connected to the arm in such a way that the expansion-contraction unit expands and contracts in a front-rear direction of the vehicle body.

DESCRIPTION OF EMBODIMENTS

First Embodiment

A vehicle step device 1 will be described with reference to FIG. 1 to FIG. 12. The vehicle step device 1 is attached directly or indirectly to a vehicle body 2. In the following description, a state in which the vehicle step device 1 is attached directly or indirectly to the vehicle body 2 is referred to as "the attached state of the vehicle step device 1".

A front-rear direction DY of the vehicle step device 1 matches a front-rear direction DYA of the vehicle body 2, in the attached state of the vehicle step device 1. A width direction DX of the vehicle step device 1 matches a width direction DXA of the vehicle body 2, in the attached state of the vehicle step device 1. An up-down direction DZ of the vehicle step device 1 matches an up-down direction DZA of the vehicle body 2, in the attached state of the vehicle step device 1.

\<Vehicle\>

Figure 1:
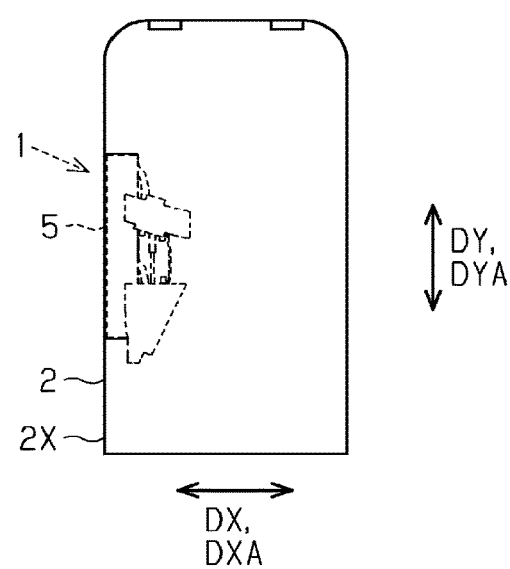
FIG. 1 is a plan view of a vehicle including a vehicle step device according to a first embodiment.

As illustrated in FIG. 1, a vehicle step device 1 is provided at the vehicle body 2. The vehicle step device 1 may be attached directly to the vehicle body 2. The vehicle step device 1 may be attached to the vehicle body 2 via a base 3. The vehicle step device 1 may be attached to the vehicle body 2 via a support member 9.

The vehicle step device 1 is attached to a lower surface of a bottom plate of the vehicle body 2. On the bottom plate of the vehicle body 2, the vehicle step device 1 is attached near a vehicle entrance that is closed by a door. A step 5 of the vehicle step device 1 is used as an auxiliary step for getting on and off. Thus, the step 5 of the vehicle step device 1 is arranged on a lower side of a lower end of the vehicle entrance. The step 5 of the vehicle step device 1 is moved by power of a motor 53. The step 5 of the vehicle step device 1 is moved from a retracted position of being accommodated under the bottom plate of the vehicle body 2 to a deployed position, in response to a predetermined operation command at the time of getting on and off. The deployed position (refer to FIG. 11) is located separate, relative to the vehicle body 2, outward in the width direction DX from the retracted position (refer to FIG. 12). When the step 5 is moved as far as the deployed position, the step 5 is arranged in such a way that at least a part of the step 5 is exposed from the vehicle body 2 in a plan view.

Figure 2:
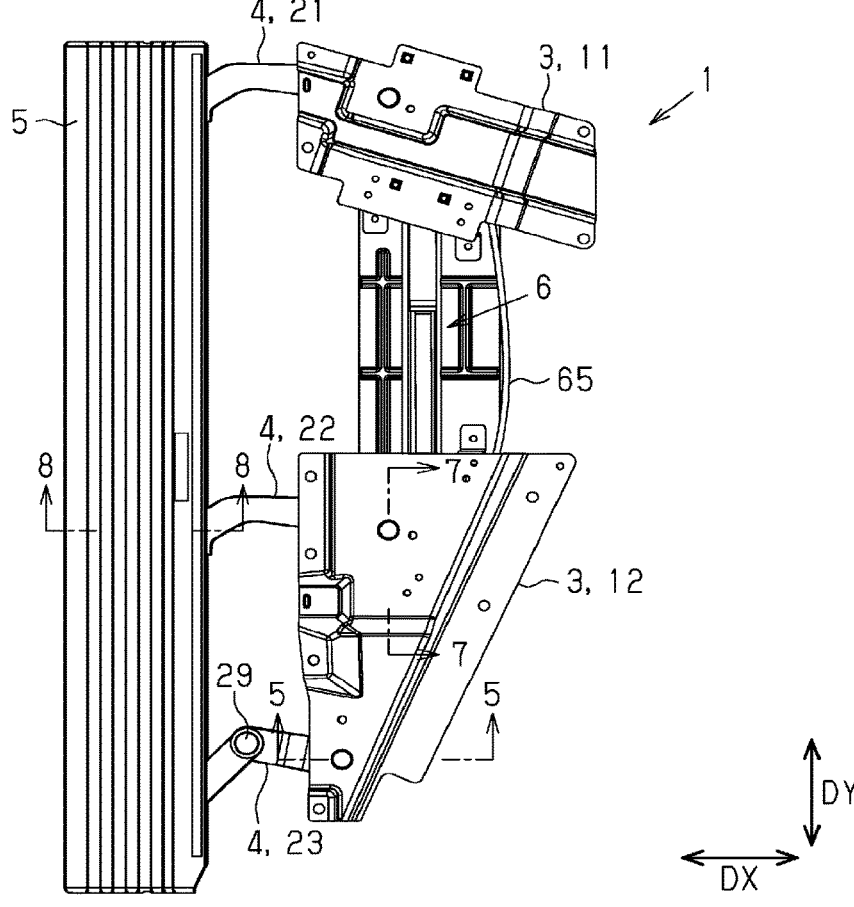
FIG. 2 is a plan view of the vehicle step device of FIG. 1.

As illustrated in FIG. 2, the vehicle step device 1 includes an arm 4, the step 5 that is attached to the arm 4, and a drive unit 6 that drives the arm 4. In the present embodiment, the vehicle step device 1 includes the three arms 4. In the vehicle step device 1, the three arms 4 are referred to as the first arm 21, the second arm 22, and the third arm 23 in order from a front side. When the first arm 21 to the third arm 23 are not distinguished from each other, these arms are referred to simply as the arms 4.

The arm 4 is attached to a vehicle body structure 2X that includes the vehicle body 2. The vehicle body structure 2X may be only the vehicle body 2. The vehicle body structure 2X may include the vehicle body 2, and the support member 9 that supports the arm 4. The vehicle body structure 2X may include the vehicle body 2, the base 3 attached to the vehicle body 2, and the support member 9.

For example, the arm 4 is attached directly to the vehicle body 2. The arm 4 may be attached to the vehicle body 2 via the base 3. The arm 4 may be attached to the support member 9 that is fixed to the base 3. In the present embodiment, the arm 4 is attached to the vehicle body 2 via the base 3 and the support member 9.

<Base>

Figure 3:
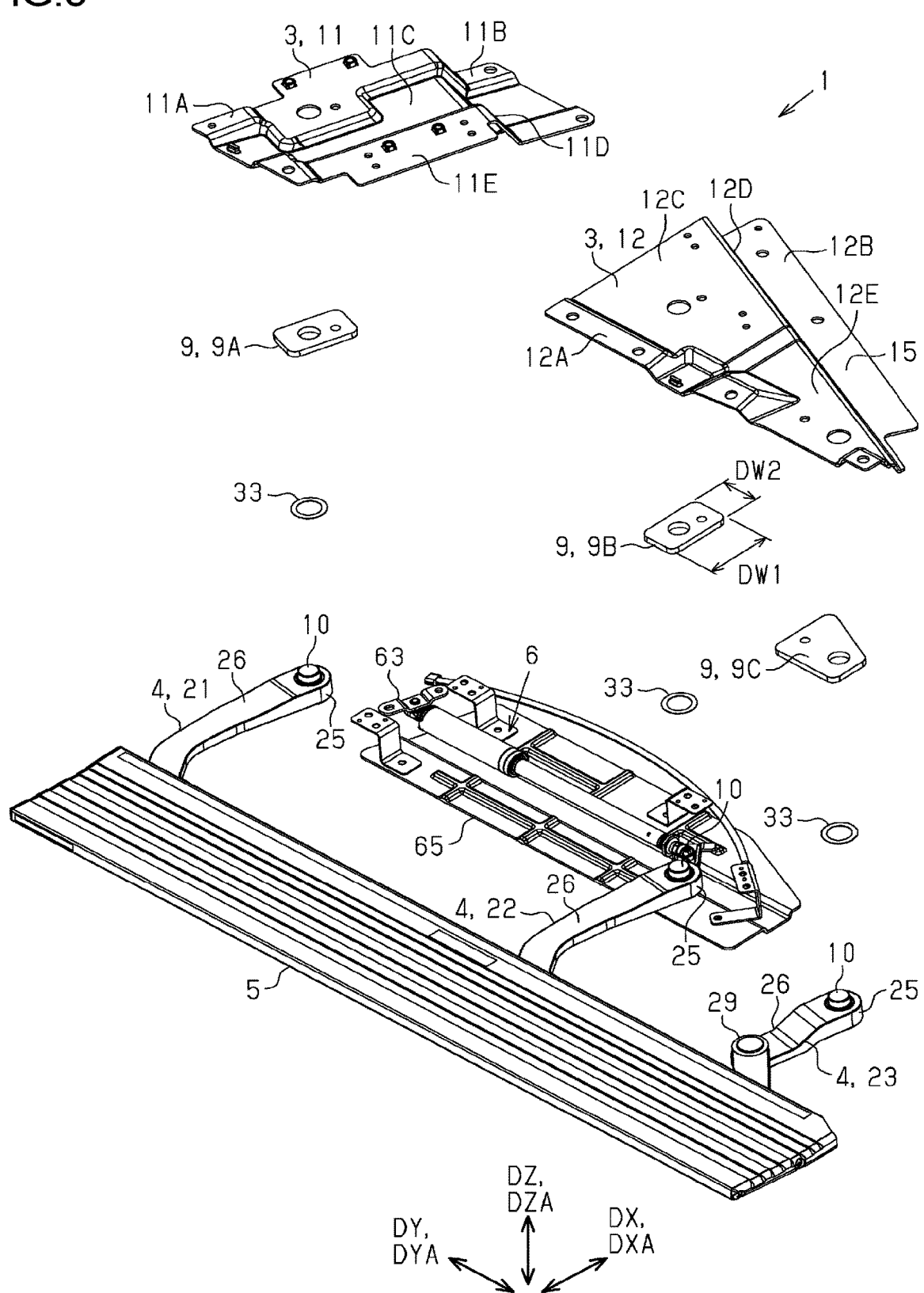
FIG. 3 is an exploded perspective view of the vehicle step device of FIG. 1.

As illustrated in FIG. 3, the base 3 includes a first base 11 and a second base 12. The first base 11 is arranged on a front side of the second base 12 in the vehicle body 2. The first base 11 supports a base portion 25 of the first arm 21. The second base 12 supports a base portion 25 of the second arm 22 and a base portion 25 of the third arm 23.

The first base 11 includes a first fastened portion 11A, a second fastened portion 11B that is arranged on an inner side of the first fastened portion 11A in the width direction DX, and a first intermediate portion 11C that is between the first fastened portion 11A and the second fastened portion 11B.

The second fastened portion 11B is provided at position lower than the first intermediate portion 11C in the up-down direction DZ. The second fastened portion 11B is connected to the first intermediate portion 11C via a first stepped portion 11D. The first fastened portion 11A and the second fastened portion 11B are fastened to the vehicle body 2 with screws or rivets. A first support member 9A having a plate shape is fixed to the shaft support portion 11X of the first intermediate portion 11C of the first base 11. The first arm 21 is attached to the first support member 9A.

Figure 4:
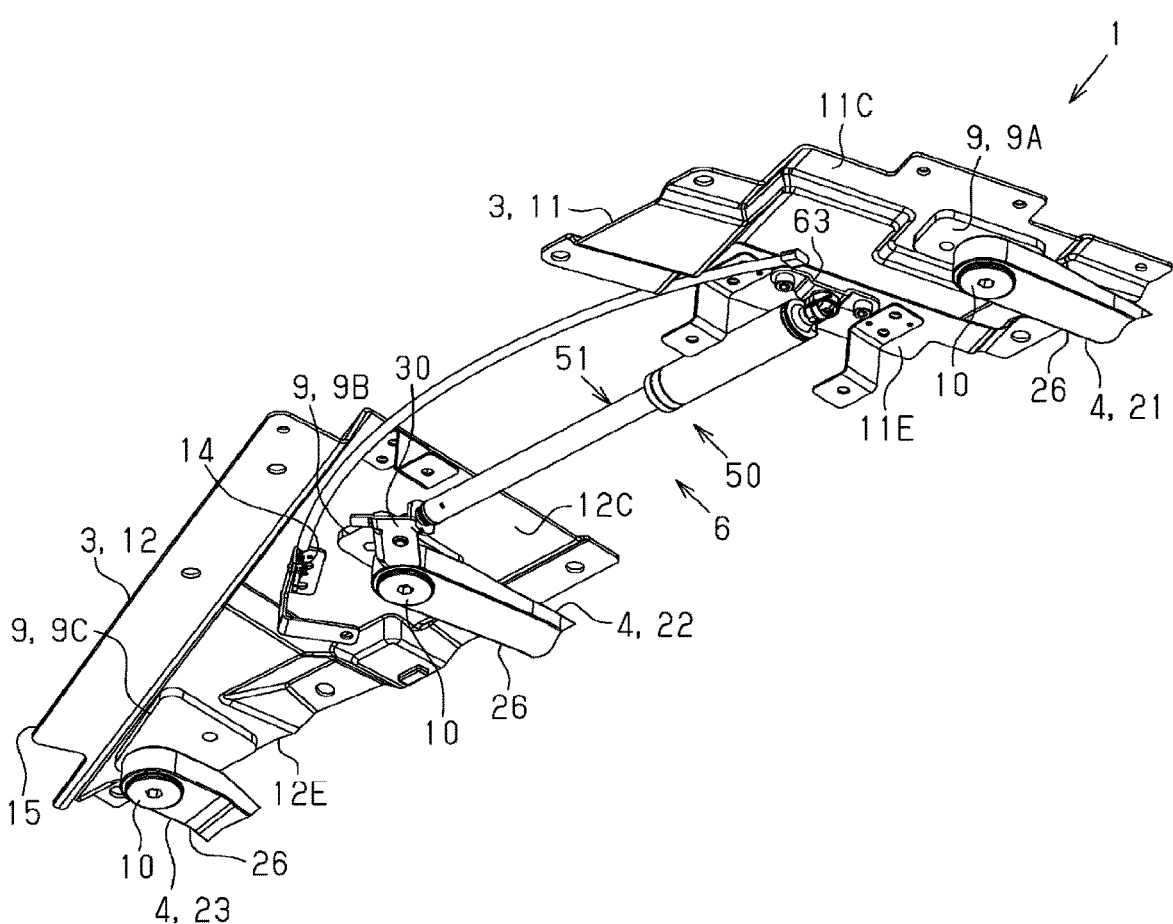
FIG. 4 is a perspective view of the vehicle step device of FIG. 1 when viewed from a lower side.

As illustrated in FIG. 4, the first base 11 further includes an expansion-contraction unit support portion 11E. The expansion-contraction unit support portion 11E is provided in such a way as to protrude rearward from the first intermediate portion 11C. The expansion-contraction unit support portion 11E supports a body portion 51 of the expansion-contraction unit 50.

As illustrated in FIG. 3, the second base 12 includes a third fastened portion 12A, a fourth fastened portion 12B, a second intermediate portion 12C, and a rear portion 12E that extends rearward from the second intermediate portion 12C. The fourth fastened portion 12B is a part arranged closer to the center of the vehicle body in the width direction DX than the third fastened portion 12A is. The second intermediate portion 12C is a part between the third fastened portion 12A and the fourth fastened portion 12B.

The fourth fastened portion 12B is provided at a position lower than the second intermediate portion 12C in the un-down direction DZ. The fourth fastened portion 12B is connected to the second intermediate portion 12C via a second stepped portion 12D. The third fastened portion 12A and the fourth fastened portion 12B are fastened to the vehicle body 2 with screws or rivets. The third fastened portion 12A and the fourth fastened portion 12B may be attached to the vehicle body 2 by welding or the like.

The fourth fastened portion 12B of the second base 12 is fastened to the vehicle body 2 by screws arranged in a single line. A second support member 9B having a plate shape is fixed to the second intermediate portion 12C of the second base 112. The second arm 22 is attached to the second support member 9B. A third support member 9C having a plate shape is fixed to the rear portion 12E of the second base 12. The third arm 23 is attached to the third support member 9C.

As illustrated in FIG. 4, the second base 12 is provided with a switch 14. By on-operation of the switch 14, the switch 14 outputs a signal for stopping operation of the drive unit 6. The switch 14 is arranged at a position where the extension portion 30 of the second arm 22 can come into contact with the switch 14. Specifically, the switch 14 is arranged in such a way that the extension portion 30 of the second arm 22 comes into contact with a lever of the switch 14 in arrangement of the second arm 22 when the step 5 is arranged at the retracted position.

Figure 5:
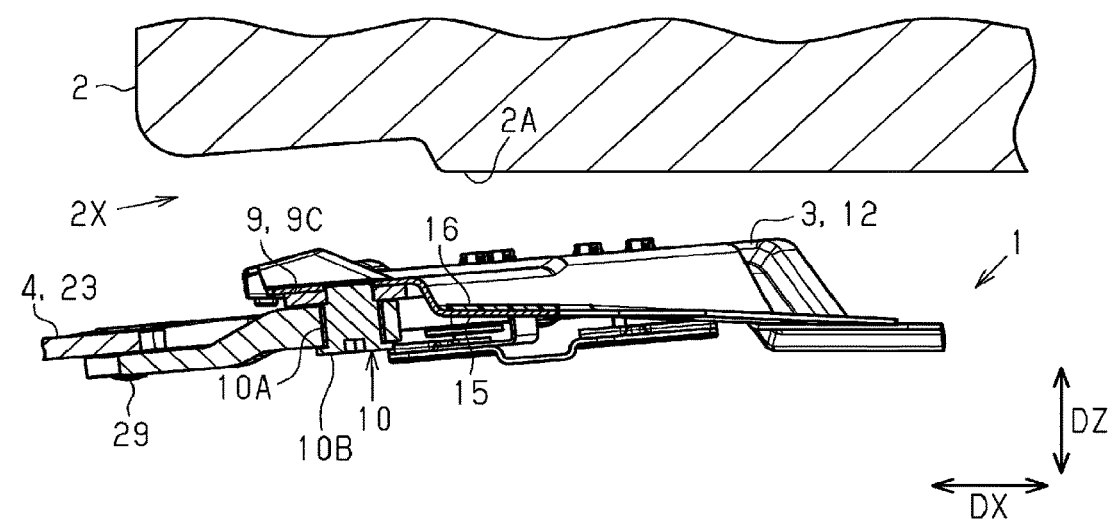
FIG. 5 is a sectional view of the vehicle step device taken along the 5-5 line in FIG. 2.
Figure 6:
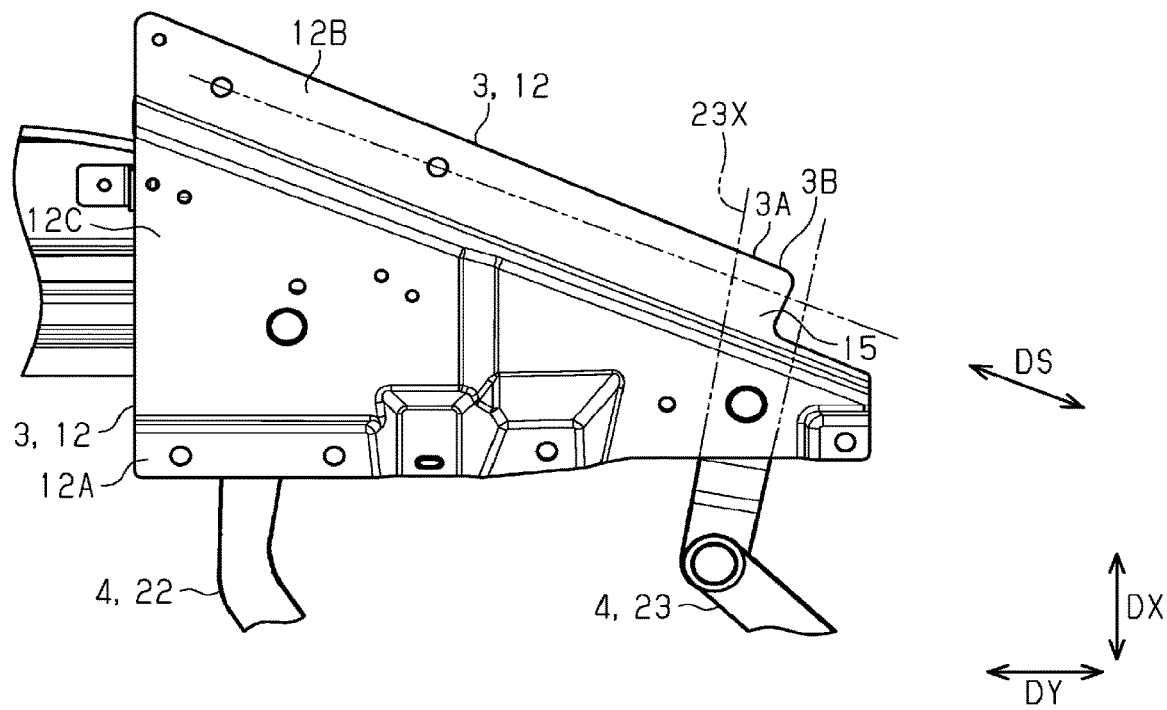
FIG. 6 is a plan view of a second base in the vehicle step device of FIG. 1.

As illustrated in FIG. 5 and FIG. 6, the second base 12 includes a contact portion 15 that comes into contact against a lower surface of the vehicle body 2. The contact portion 15 is arranged closer to the center of the vehicle body in the width direction DX than the third fastened portion 12A is. The contact portion 15 is provided at least on a front side of or on a rear side in the second base 12.

The contact portion 15 is provided at an extension association part 3A in the base 3. The extension association part 3A is a part that is included in the base 3 and at which an imaginary extension portion 23X and the second base 12 overlap with each other. The imaginary extension portion 23X indicates an extension portion when the third arm 23 is made to extend in a direction opposite to a direction in which the arm portion 26 extends relative to the base portion 25 of the third arm 23 in a case where the arm 4 is arranged at the deployed position in the attached state of the vehicle step device 1.

Further, the contact portion 15 may be provided at a part that is the extension association part 3A and that is also a screw extension portion 3B. The screw extension portion 3B indicates an extension portion when the fourth fastened portion 12B is made to extend in a direction DS along the line of the screws of the fourth fastened portion 12B in the base 3.

As illustrated in FIG. 5, the vehicle step device 1 may include a cushioning member 16.

The cushioning member 16 is provided between the contact portion 15 and a contacted part 2A that is included in the vehicle body 2 and against which the contact portion 15 comes into contact. The cushioning member 16 is formed into a sheet shape. The cushioning member 16 may be adhered to the contacted part 2A of the vehicle body 2. The cushioning member 16 may be provided on the contact portion 15. The cushioning member 16 is provided in order to suppress peeling of paint on the vehicle body 2 caused by direct contact between the contact portion 15 and the vehicle body 2, or in order to suppress vibration noise caused by direct contact between the contact portion 15 and the vehicle body 2. The cushioning member 16 is constituted by a rubber sheet or a resin sheet. The cushioning members 16 may be provided on both of the contacted part 2A of the vehicle body 2 and the contact portion 15.

<Support Member>

The support member 9 is provided directly or indirectly on the vehicle body 2. In one example, the support member 9 is attached to the base 3. The support member 9 is made of metal. The support member 9 is formed as a plate member having a predetermined thickness. The thickness of the support member 9 is larger than a thickness of the base 3. The support member 9 is fixed to the base 3 by welding. The support member 9 includes a first support member 9A to a third support member 9C.

At least one of the first support member 9A to the third support member 9C may have the following formation. In the attached state of the vehicle step device 1, a first width DW1 of the support member 9 along the width direction DX is larger than a second width DW2 of the support member 9 along a direction perpendicular to the width direction DX (refer to FIG. 3).

At least one of the first support member 9A to the third support member 9C may have the following formation. In the attached state of the vehicle step device 1, both end portions of the support member 9 in the width direction DX are more firmly fixed to the vehicle body 2 or the base 3 fixed to the vehicle body 2 than both end portions of the support member 9 in a direction intersecting with the width direction DX are.

<Arm>

Each of the arms 4 includes the base portion 25 and the arm portion 26. The arm portion 26 extends from the base portion 25 toward the step 5. The base portion 25 of each of the arms 4 is rotatably attached to the base 3. Rotational axes of the base portions 25 of the respective arms 4 are parallel to each other. The base portion 25 includes a penetration hole 25A through which the shaft member 10 is inserted. The shaft member 10 is inserted into the penetration hole 25A.

The base portion 25 is supported by the vehicle body 2 or the base 3 via the support member 9. Specifically, the arm 4 is rotatably attached to the vehicle body structure 2X by the support member 9 and the shaft member 10 (refer to FIG. 7). The distal end portion 28 of the arm 4 includes a penetration hole 28A through which a step shaft member 41 is inserted (refer to FIG. 8).

The arm portion 26 of the third arm 23 includes a joint portion 29 (refer to FIG. 3). The arm portion 26 of the third arm 23 bends and stretches around an axis provided at the joint portion 29. Since the third arm 23 includes the joint portion 29, the step 5 moves smoothly.

The second arm 22 includes a base portion 25, an arm portion 26, and an extension portion 30 (refer to FIG. 4). The extension portion 30 may be formed as a member separate from the base portion 25 and the arm portion 26. The extension portion 30 extends in a direction that is opposite to the arm portion 26 at the base portion 25. The extension portion 30 includes a first part 30A where a ball portion 61 of a ball joint 60 is provided, and a second part 30B that extends from the first part 30A (refer to FIG. 10). The second part 30B is provided at the first part 30A in such a way as to come into contact against the switch 14 when the second arm 22 is arranged at an arm retracted position. The arm retracted position is a position of the second arm 22 when the step 5 is arranged at the retracted position.

Figure 7:
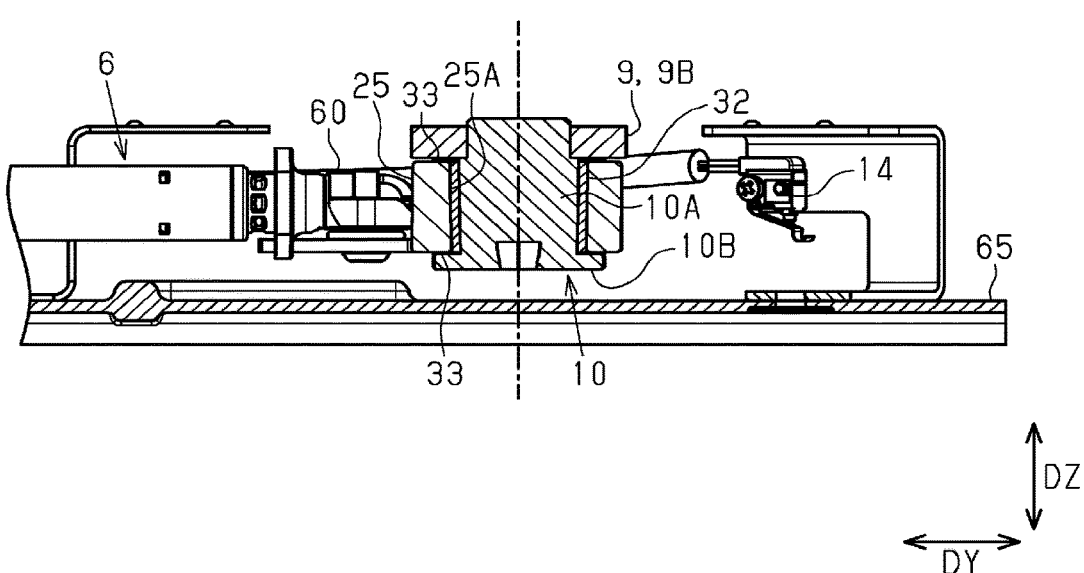
FIG. 7 is a sectional view of the vehicle step device taken along the 7-7 line in FIG. 2.

A support structure for the arm 4 will be described with reference to FIG. 7. FIG. 7 is a sectional view of the base portion 25 of the second arm 122. FIG. 7 omits an illustration of the second base 12.

As illustrated in FIG. 7, the shaft member 10 is attached to the support member 9. The shaft member 10 includes a shaft body portion 10A that is attached to the support member 9 through the penetration hole 25A of the arm 4, and a head portion 10B that is provided at an end of the shaft body portion 10A. The base portion 25 of the arm 4 is sandwiched and held by the head portion 10B and the support member 9.

An end portion of the shaft member 10 is joined to the support member 9 in a state where the shaft body portion 10A is inserted into the penetration hole 25A of the arm 4. A bush 32 is arranged between the penetration hole 25A and the shaft member 10. The head portion 10B of the shaft member 10 supports a lower surface of the base portion 25 of the arm 4. A washer 33 is arranged between the head portion 10B of the shaft member 10 and the base portion 25 of the arm 4. A washer 33 is arranged between the support member 9 and the base portion 25 of the arm 4.

A distal end portion 28 of the arm 4 is rotatably attached to the step 5. The distal portion 28 of each of the arms 4 is attached to a part included in the step 5 and closer to the vehicle body in the width direction DX. The rotational axes of the distal end portions 28 of the respective arms 4 are parallel to each other.

Figure 8:
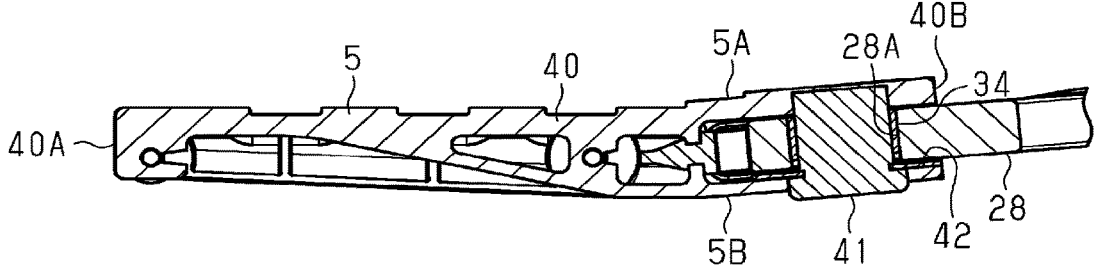
FIG. 8 is a sectional view of the vehicle step device taken along the 8-8 line in FIG. 2.

As illustrated in FIG. 8, the distal end portion 28 of the arm 4 is provided with a penetration hole 28A. The step shaft member 41 is inserted into the penetration hole 28A. An upper end portion of the step shaft member 41 is joined to an upper surface portion 5A of the step 5 in a state where the step shaft member 41 is inserted into the penetration hole 28A of the arm 4. A lower end portion of the step shaft member 41 is joined to a lower surface portion 5B of the step 5 in the state where the step shaft member 41 is inserted into the penetration hole 28A of the arm 4. A bush 34 is arranged between the penetration hole 28A and the step shaft member 41.

<Step>

The step 5 is supported by the first arm 21, the second arm 22, and the third arm 23. The step 5 is supported by the first arm 21 to the third arm 23 in such a way as to be movable relative to the vehicle body 2. The step 5 includes a step body portion 40. For example, the step body portion 40 is made of aluminum or an aluminum alloy. The step body portion 40 is formed by extrusion or drawing.

As illustrated in FIG. 8, the step body portion 40 includes a first side surface 40A and a second side surface 40B that is arranged closer to the vehicle body in the width direction DX than the first side surface 40A is. A groove portion 42 is provided on the second side surface 40B, and is concave toward the first side surface 40A. The groove portion 42 is open toward the vehicle body 2 in the attached state of the vehicle step device 1. The groove portion 42 is formed in such a way as to receive the distal end portion 28 of the arm 4.

<Drive Unit>

The drive unit 6 includes the expansion-contraction unit 50. The expansion-contraction unit 50 includes the body portion 51 and a movement portion 52 that moves relative to the body portion 51. The body portion 51 is connected directly or indirectly to the vehicle body 2. The movement portion 52 is connected to the arm 4.

Figure 9:
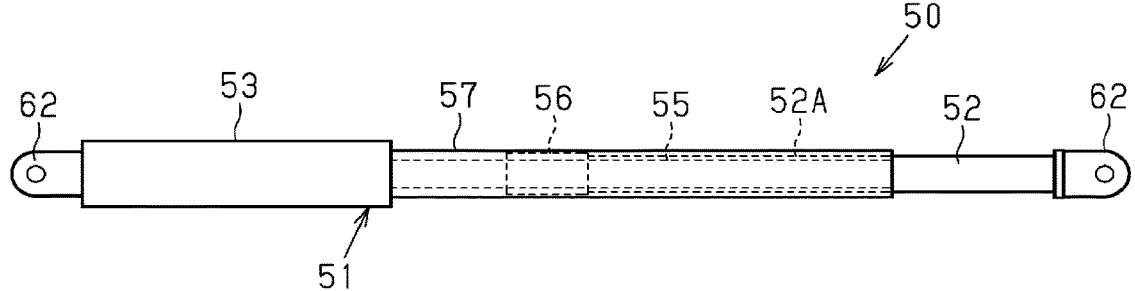
FIG. 9 is a schematic diagram of an expansion-contraction unit in the vehicle step device of FIG. 1.

As illustrated in FIG. 9, the body portion 51 includes a spindle 55 that is rotated by the motor 53, a nut 56 that engages with the spindle 55, and an outer cylinder 57. The outer cylinder 57 guides the nut 56 in such a way that the nut 56 moves along the spindle 55 by rotation of the spindle 55.

In one example, the body portion 51 includes the motor 53. The motor 53 is attached to an end of the outer cylinder 57. The spindle 55 and the nut 56 are arranged inside the outer cylinder 57. The movement portion 52 includes a cylindrical portion 52A. The cylinder portion 52A of the movement portion 52 is inserted into the outer cylinder 57. The nut 56 is attached to an end portion of the cylindrical portion 52A of the movement portion 52. When the spindle 55 rotates, the movement portion 52 moves along the spindle 55 together with the nut 56.

The body portion 51 is rotatably attached to the vehicle body 2 or the base 3.

For example, the body portion 51 is attached to the vehicle body 2 or the base 3 via a ball joint 60. The ball joint 60 includes a ball portion 61 and a ball reception portion 62 that receives the ball portion 61. The ball portion 61 is attached directly or indirectly to the vehicle body 2. The ball reception portion 62 is provided at an end portion of the body portion 51.

Figure 10:
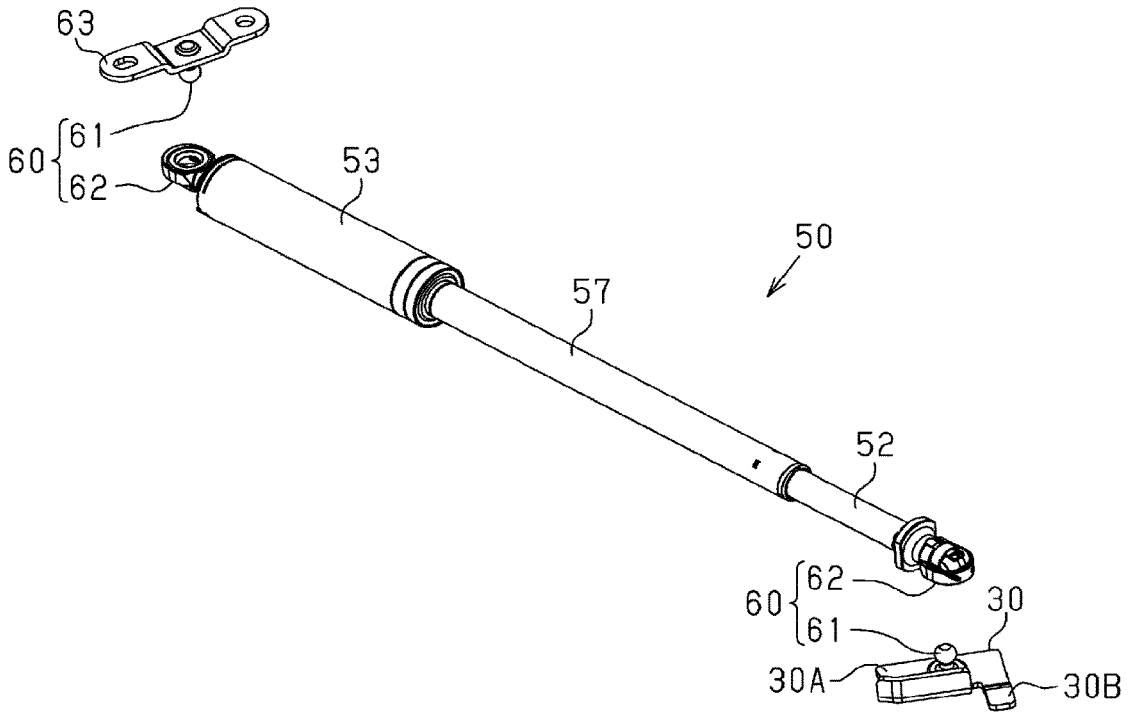
FIG. 10 is a perspective view of the expansion-contraction unit in the vehicle step device of FIG. 1.

As illustrated in FIG. 10, the body portion 51 is detachably attached to the vehicle body 2 or the base 3 by screws. Specifically, the ball portion 61 of the ball joint 60 is fixed to an attachment member 63. The attachment member 63 is attached to the expansion-contraction unit support portion 11E of the first base 11 by screws (refer to FIG. 4). The attachment member 63 is attached in such a way that the attachment member 63 can be detached from the expansion-contraction unit support portion 11E of the first base 11 by loosening the screws.

A distal end portion of the movement portion 52 is rotatably attached to the extension portion 30 of the second arm 22 (refer to FIG. 4). Specifically, a distal end portion of the spindle 55 is attached to the extension portion 30 of the second arm 22 via a ball joint 60. The ball joint 60 includes a ball portion 61 and a ball reception portion 62 that receives the ball portion 61. The ball portion 61 is attached to the extension portion 30 of the second arm 22. The ball reception portion 62 is provided at the distal end portion of the movement portion 52.

Figure 11:
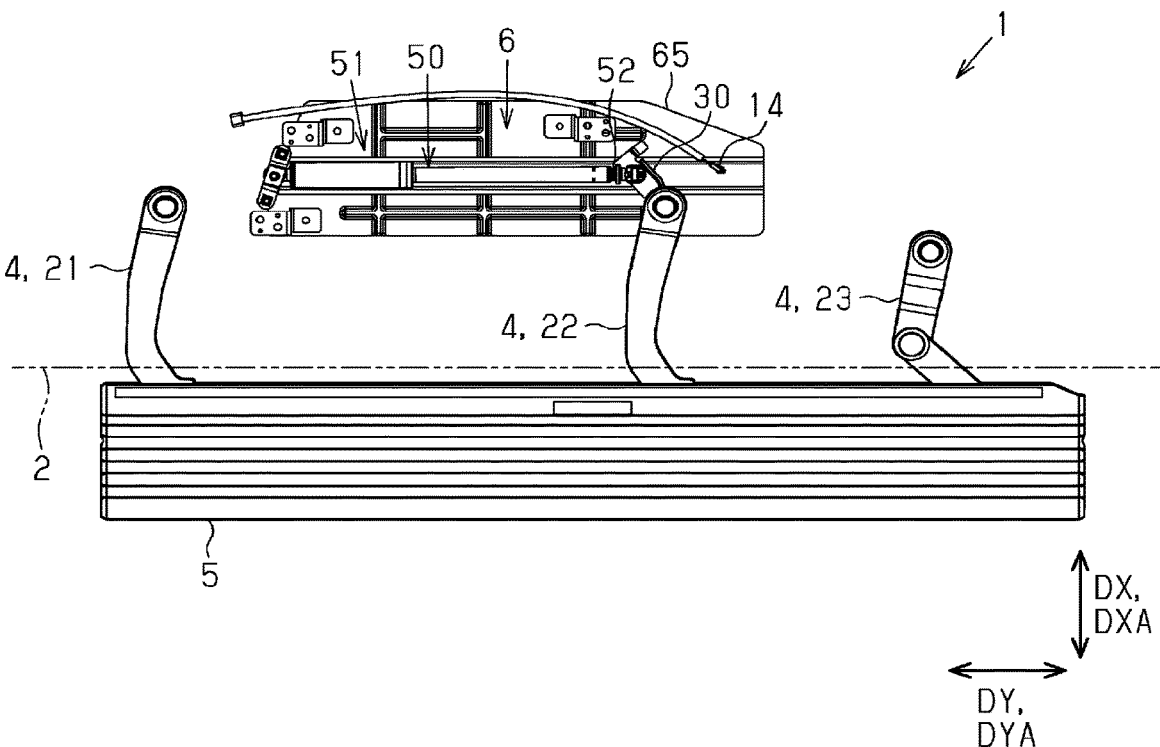
FIG. 11 is a plan view of the vehicle step device of FIG. 1 when a step is arranged at a deployed position.
Figure 12:
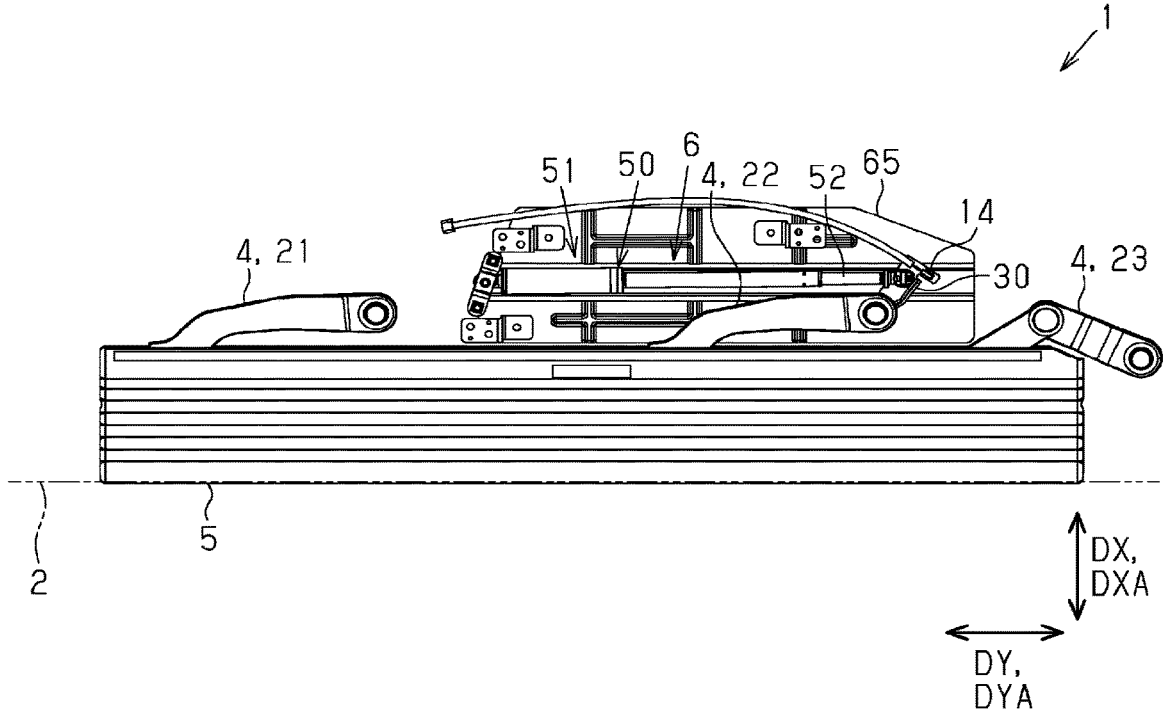
FIG. 12 is a plan view of the vehicle step device of FIG. 1 when the step is arranged at a retracted position.

As illustrated in FIG. 11 and FIG. 12, the expansion-contraction unit 50 is arranged in such a way that the spindle 55 is arranged along the front-rear direction DYA of the vehicle body 2 in the attached state where the vehicle step device 1 is attached to the vehicle body 2 or the base 3. In the state where the vehicle step device 1 is attached to the vehicle body 2, the movement portion 52 is connected to the arm 4 in such a way that the expansion-contraction unit 50 expands and contracts in the front-rear direction DYA of the vehicle body 2.

The vehicle step device 1 may further include a reception member 65. The reception member 65 receives the expansion-contraction unit 50. The reception member 65 is provided in order to prevent the expansion-contraction unit 50 from falling to the ground. The reception member 65 is arranged under the expansion-contraction unit 50 in the state where the vehicle step device 1 is attached to the vehicle body 2 or the base 3. The reception member 65 is fixed to the base 3 via a hanging member.

The step 5 operates by the drive unit 6 as follows.

In a state where the step 5 is arranged at the retracted position, the arm 4 is arranged in such a way as to be along the front-rear direction DY. At this time, the movement portion 52 of the expansion-contraction unit 50 is arranged at a position separated from the body portion 51 by a predetermined distance (refer to FIG. 12). When driving of the motor 53 causes the movement portion 52 to move in such a way as to approach the body portion 51, the extension portion 30 of the second arm 22 is pulled toward the first base 11 by the expansion-contraction unit 50. Interlocking with the rotation of the second arm 22, the first arm 21 and the third arm 23 move, and the step 5 moves toward the deployed position (refer to FIG. 11).

Effects of the Present Embodiment Will be Described.

The expansion-contraction unit 50 is arranged in such a way that a line along a longitudinal direction DYA of the movement portion 52 is along the longitudinal direction DYA of the vehicle body 2 (refer to FIG. 11 and FIG. 12). Specifically, the expansion-contraction unit 50 is arranged in such a way that the spindle 55 is along the longitudinal direction DYA of the vehicle body 2. The expansion-contraction unit 50 extends and contracts in the longitudinal direction DYA of the vehicle body 2. Thus, an area occupied by the drive unit 6 is smaller in the width direction DXA of the vehicle body 2 than that of a different drive unit including a sector gear. According to the vehicle step device 1, the area occupied in the width direction DXA of the vehicle body 2 can be made smaller, and thus, a device having a larger width can be installed on a lower surface of the vehicle body 2. For example, according to the vehicle step device 1, a battery having a larger width can be easily installed at the vehicle body 2.

The vehicle step device 1 according to the present embodiment achieves the following advantageous effects.

(1) The vehicle step device 1 includes the arm 4, the step 5 attached to the arm 4, and the drive unit 6 driving the arm 4. The drive unit 6 includes the expansion-contraction unit 50. The expansion-contraction unit 50 includes the body portion 51 and the movement portion 52 that moves relative to the body portion 51. The movement portion 52 of the expansion-contraction unit 50 is connected to the arm 4 in such a way that the expansion-contraction unit 50 expands and contracts in the front-rear direction DYA of the vehicle body 2 in the attached state of the vehicle step device 1.

According to this configuration, the expansion-contraction unit 50 moves the arm 4. The movement portion 52 of the expansion-contraction unit 50 is connected to the arm 4 in such a way that the expansion-contraction unit 50 expands and contracts in the front-rear direction DYA of the vehicle body 2. Thus, a width of the vehicle step device 1 along the width direction DX can be made smaller than that of a conventional vehicle step device 1

(2) The body portion 51 of the expansion-contraction unit 50 includes the spindle 55, the nut 56 that engages with the spindle 55, and the outer cylinder 57 that guides the nut 56. The movement portion 52 moves together with the nut 56. According to this configuration, the drive unit 6 can have a simpler structure than in a case where a hydraulic or pneumatic actuator is used as the expansion-contraction unit 50.

(3) The expansion-contraction unit 50 is arranged in such a way that the spindle 55 is along the front-rear direction DYA of the vehicle body 2 in the attached state of the vehicle step device 1. According to this configuration, a width of the vehicle step device 1 along the width direction DX can be made smaller than that of a conventional vehicle step device 1.

(4) The body portion 51 of the expansion-contraction unit 50 is detachably attached to the vehicle body 2 or the base 3 by screws. According to this configuration, by detaching the body portion 51 of the expansion-contraction unit 50 from the vehicle body 2 or the base 3, the arm 4 can be easily released from restriction that is based on the expansion-contraction unit 50 and that concerns movement relative to the vehicle body 2. For example, when the expansion-contraction unit 50 becomes unable to expand and contract due to the movement portion 52 being stuck, and the step 5 cannot be moved, detaching the body portion 51 of the expansion-contraction unit 50 from the vehicle body 2 or the base 3 enables the step 5 to be moved.

(5) The body portion 51 of the expansion-contraction unit 50 is rotatably attached to the vehicle body 2 or the base 3. According to this configuration, the arm 4 can be moved more smoothly than in a case where the body portion 51 of the expansion-contraction unit 50 is non-rotatably fixed to the vehicle body 2 or the base 3.

(6) The distal end portion of the movement portion 52 of the expansion-contraction unit 50 is rotatably attached to the extension portion 30 of the second arm 22. According to this configuration, a movement range of the arm 4 can be made wider than in a case where the distal end portion of the movement portion 52 of the expansion-contraction unit 50 is non-rotatably attached to the arm portion 26.

(7) The vehicle step device 1 includes the reception member 65 that receives the expansion-contraction unit 50. The expansion-contraction unit 50 is arranged under the expansion-contraction unit 50 in the attached state of the vehicle step device 1. According to this configuration, the expansion-contraction unit 50 can be suppressed from falling to the ground.

(8) The body portion 51 of the expansion-contraction unit 50 is connected directly or indirectly to the vehicle body 2. The movement portion 52 of the expansion-contraction unit 50 is connected to the arm 4. According to this configuration, the body portion 51 is arranged near the vehicle body 2, and thus, a load applied to the arm 4 can be reduced.

Other Modified Examples

The first embodiment is not limited to the above-described configuration examples. The above-described embodiment can be modified as in the following. In the following modified examples, constituents that are not substantially modified from the constituents in the above-described embodiment are described while being denoted by the same reference signs as those of the constituents in the above-described embodiment.

Figure 13:
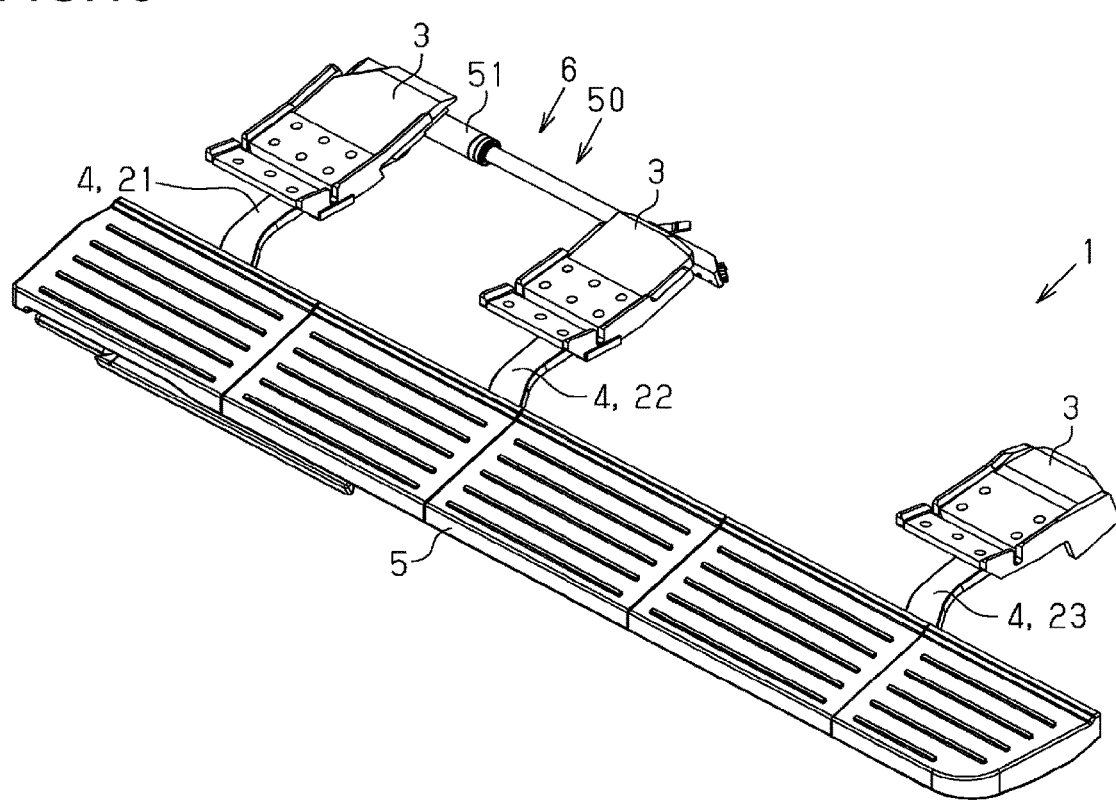
FIG. 13 is a perspective view of a modified example of the vehicle step device.
Figure 14:
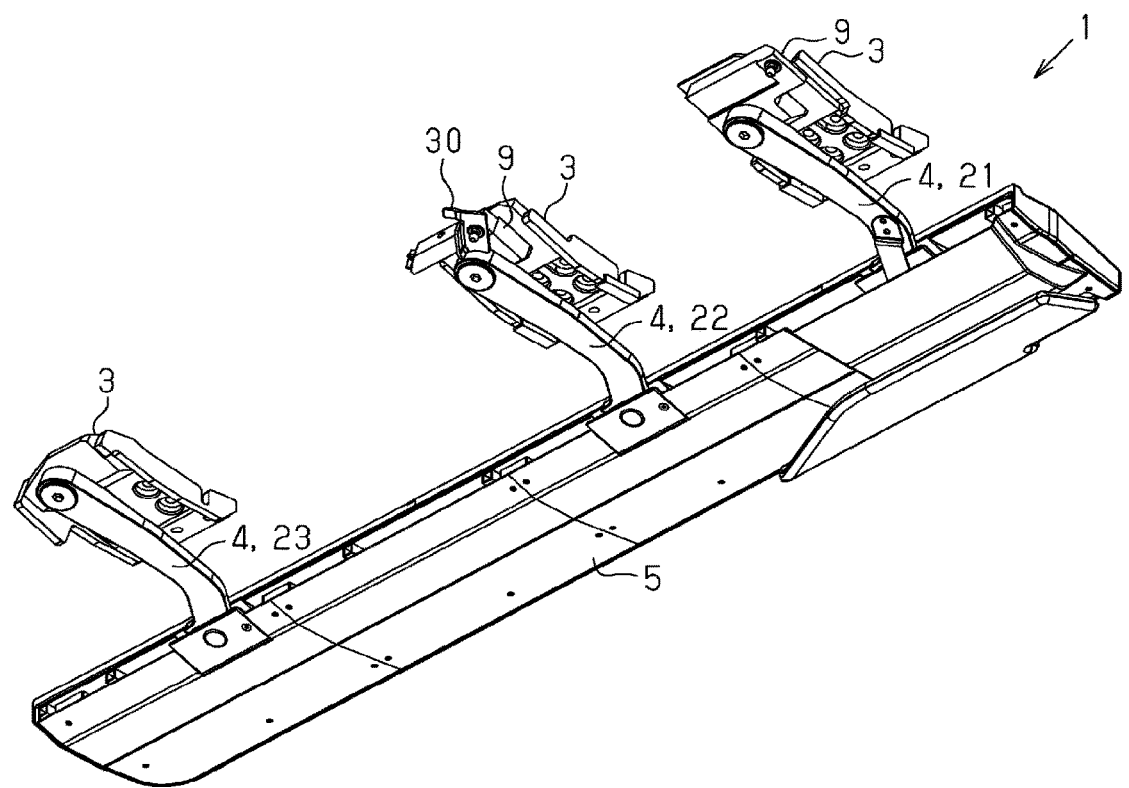
FIG. 14 is a perspective view of the vehicle step device of FIG. 13 when viewed from a lower side.

As illustrated in FIG. 13 and FIG. 14, the base 3 may be provided for each of the arms 4. The bases 3 are individually fastened to the vehicle body 2. In this example, the body portion 51 of the expansion-contraction unit 50 is attached to the base 3 that supports the first arm 21. The movement portion 52 of the expansion-contraction unit 50 is attached to the extension portion 30 of the second arm 22.

As illustrated in FIG. 14, the support member 9 may be provided in association with some arms 4 among a plurality of the arms 4. In the example illustrated in FIG. 14, the support member 9 is provided for each of the first arm 21 and the second arm 22. The third arm 23 is attached to the base 3 without being attached via the support member 9. FIG. 14 omits an illustration of the expansion-contraction unit 50.

Other examples of the expansion-contraction unit 50 include a hydraulic actuator and a pneumatic actuator. The expansion-contraction unit 50 may include two movement portions 52 provided at both end portions of the body portion 51.

In the first embodiment, the second fastened portion 11B of the first base 11 may be omitted. In this case, instead of the second fastened portion 11B, the contact portion 15 is provided at the same place as that of the second fastened portion 11B. The fourth fastened portion 12B of the second base 12 may be omitted. In this case, instead of the fourth fastened portion 12B, the contact portion 15 is provided at the same place as that of the fourth fastened portion 12B. Thereby, the fastened portions included in the base 3 and fastened to the vehicle body 2 are only the first fastened portion 11A and the third fastened portion 12A that are arranged on an outer side in the vehicle body 2 in the width direction DX, and an inner part of the vehicle body 2 in the width direction DX is not fastened. Thus, a degree of freedom in the vehicle body structure that is an attaching target of the vehicle step device 1 increases, and the vehicle step device 1 can be mounted on various types of vehicles. Since the vehicle step device 1 itself does not have a fastened structure at the inner part in the width direction DX, the vehicle step device 1 is allowed to be compact.

Second Embodiment

A vehicle step device 1 according to a second embodiment will be described with reference to FIG. 15 to FIG. 28. In the present embodiment, constituents common to those in the first embodiment are denoted by the same reference signs as those in the first embodiment, and the description concerning the overlapping constituents is omitted. In the present embodiment, an inner side of a target in the width direction DX refers to an area that is closer to the center of the vehicle body in the width direction DX than the target is. An outer side of a target in the width direction DX refers to an area that is more separated from the center of the vehicle body in the width direction DX than the target is.

Figure 15:
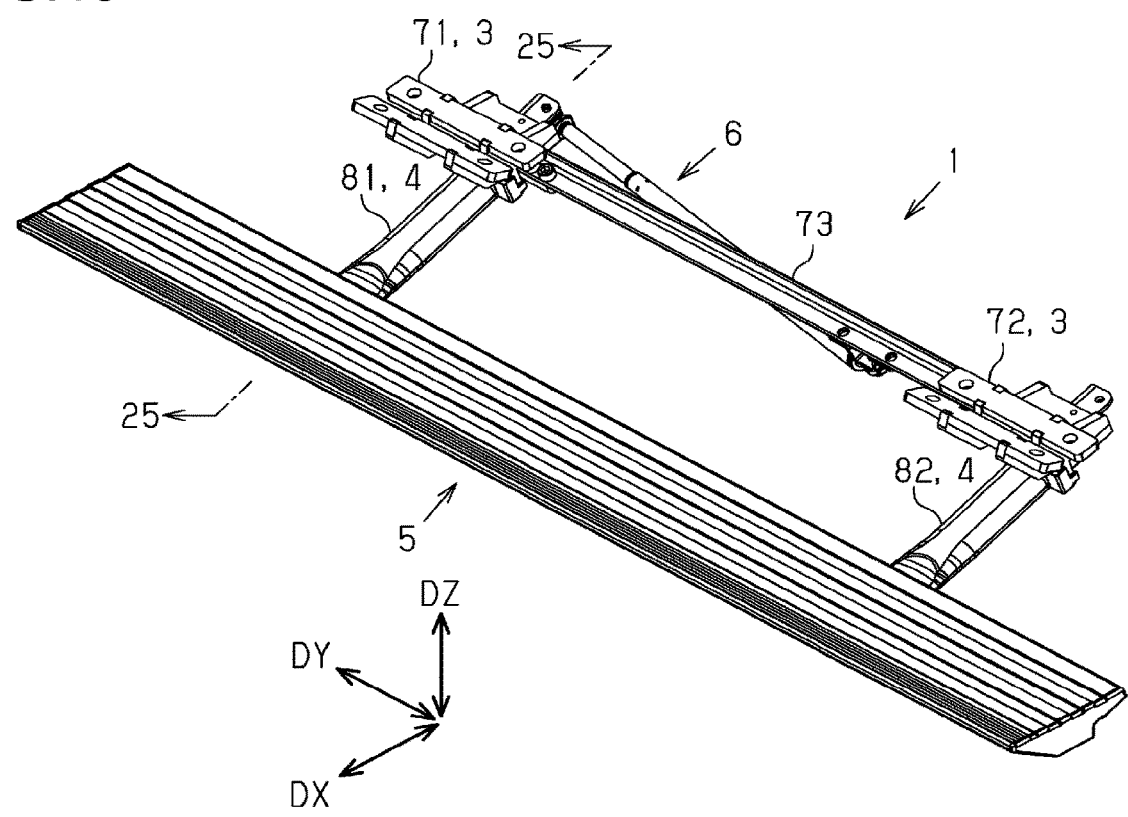
FIG. 15 is a perspective view of the vehicle step device according to a second embodiment, in which the step is located at the deployed position.
Figure 16:
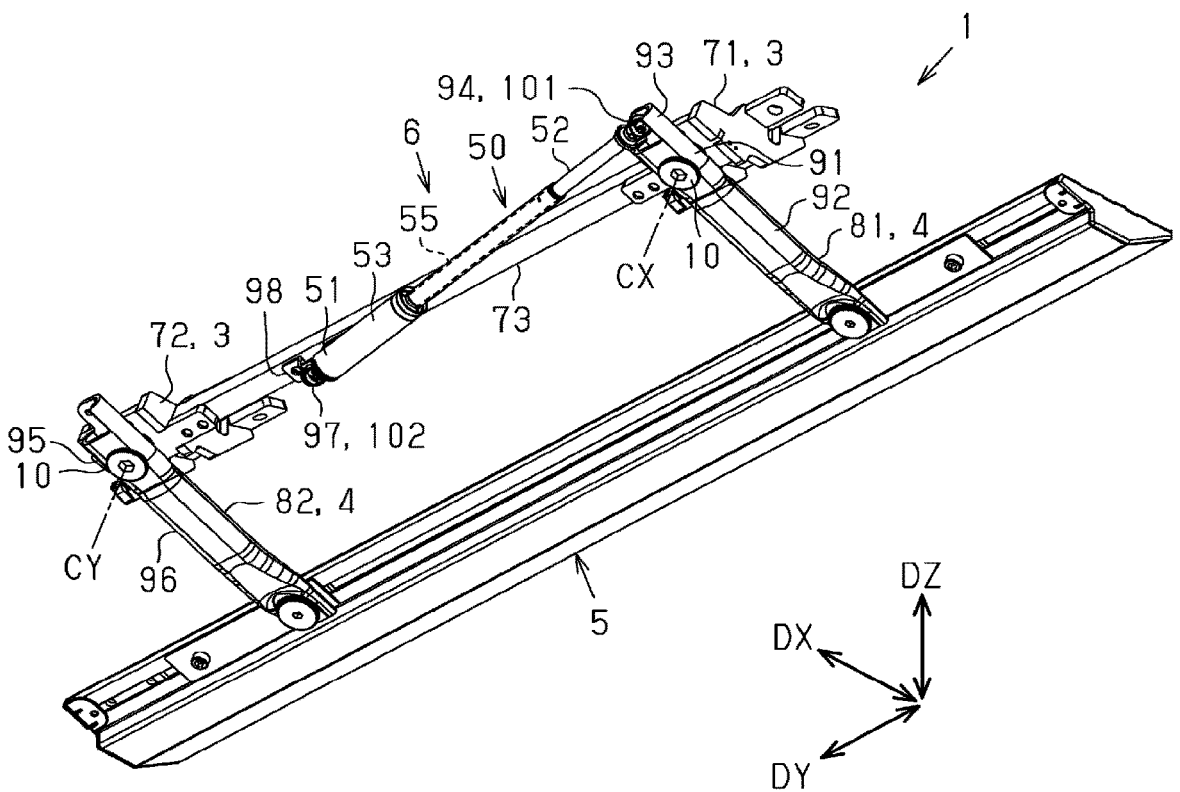
FIG. 16 is a perspective view of the vehicle step device of FIG. 15 viewed from a lower side.
Figure 17:
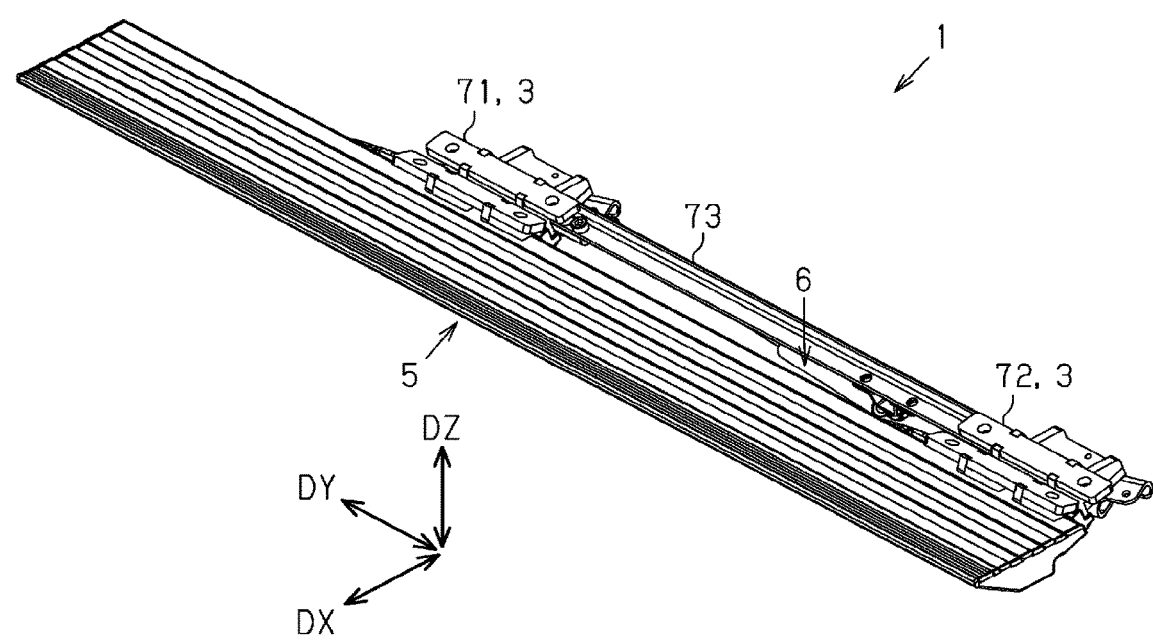
FIG. 17 is a perspective view of the vehicle step device of FIG. 15, in which the step is located at the retracted position.
Figure 18:
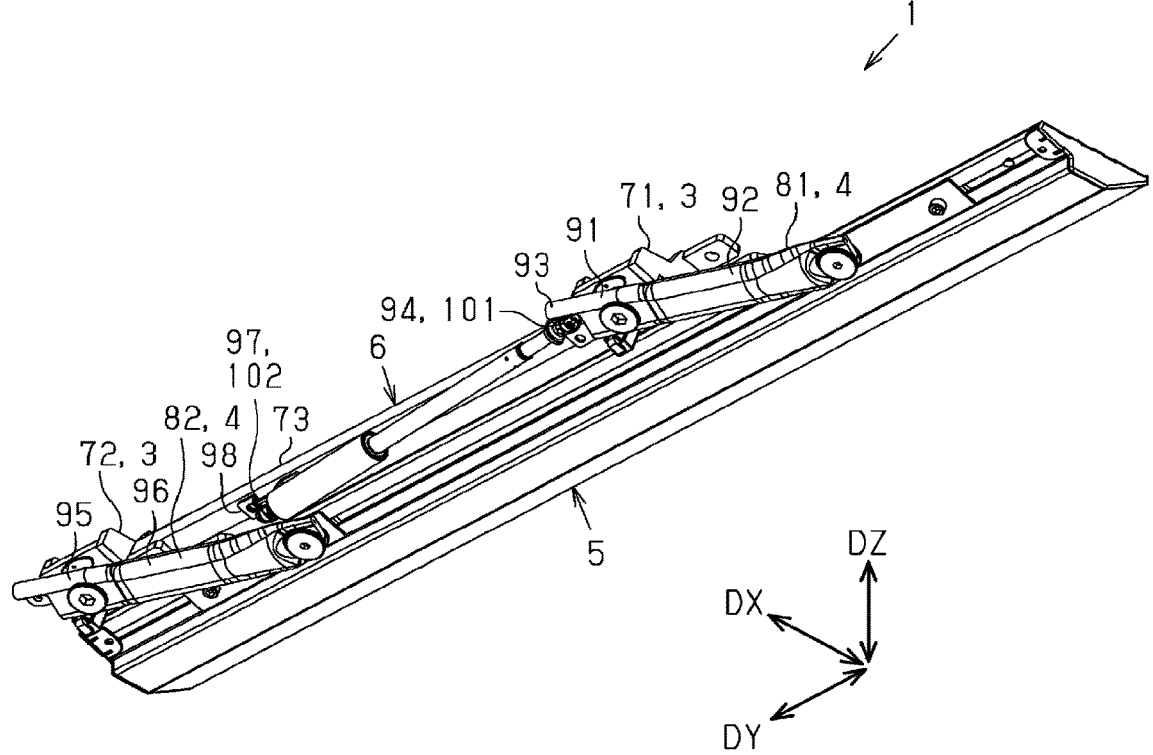
FIG. 18 is a perspective view of the vehicle step device of FIG. 17 viewed from a lower side.

As illustrated in FIG. 15 and FIG. 16, at the time that a person gets on or off the vehicle, the step 5 is arranged at the deployed position. As illustrated in FIG. 17 and FIG. 18, at the time of traveling of the vehicle, the step 5 is arranged at the retracted position.

Figure 19:
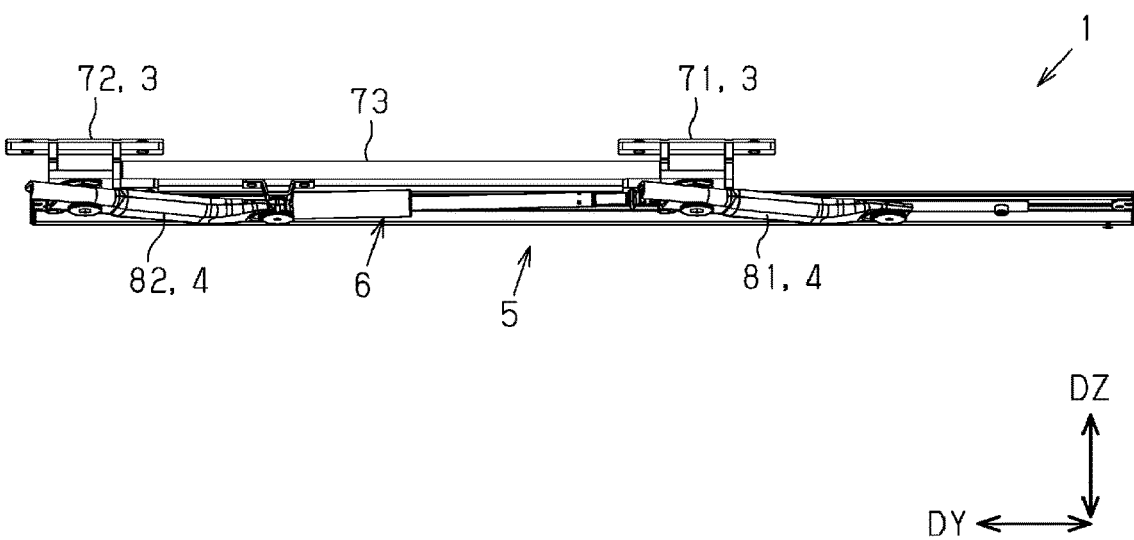
FIG. 19 is a side view of the vehicle step device of FIG. 17.

As illustrated in FIG. 19, when the step 5 is arranged at the retracted position, the step 5 is arranged near the base 3. At this time, at least a part of the step 5 is hidden under the vehicle body 2.

Figure 20:
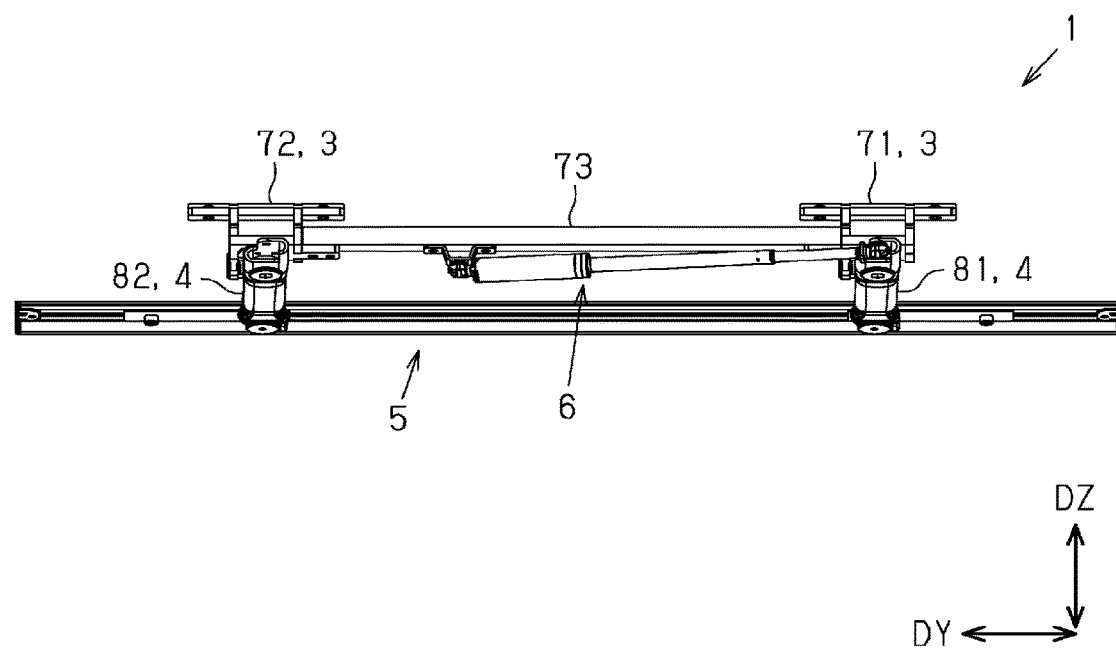
FIG. 20 is a side view of the vehicle step device of FIG. 15.

As illustrated in FIG. 20, when the step 5 is arranged at the deployed position, the step 5 is arranged at a position lower than a position of the step 5 located at the retracted position. As can be understood from FIG. 15 to FIG. 20, the step 5 moves rearward from the retracted position while moving downward and outward in the vehicle width direction, and reaches the deployed position.

As illustrated in FIG. 16 and FIG. 18, the vehicle step device 1 includes the arm 4, the step 5 attached to the arm 4, and the drive unit 6 driving the arm 4. In the present embodiment, the vehicle step device 1 includes the two arms 4. In the vehicle step device 1, the two arms 4 are referred to as a first arm 81 and a second arm 82 from a front side. When the first arm 81 and the second arm 82 are not distinguished from each other, the first arm 81 and the second arm 82 are referred to simply as the arms 4. The step 5 is supported by the first arm 81 and the second arm 82.

The base 3 is fixed to a rocker of the vehicle. The rocker constitutes a lower portion of a side surface of the vehicle body. The base 3 is fixed to the rocker by bolts. The base 3 may be fixed, by bolts, to a member or the like located on an inner side of the rocker in the width direction DXA. The base 3 supports the arms 4.

In the present embodiment, the base 3 includes a first base 71, a second base 72, and a coupling bar 73. The first base 71 is arranged on a front side of the second base 72. The second base 72 has the same structure as that of the first base 71. The first base 71 will be described.

<Base>

Figure 21:
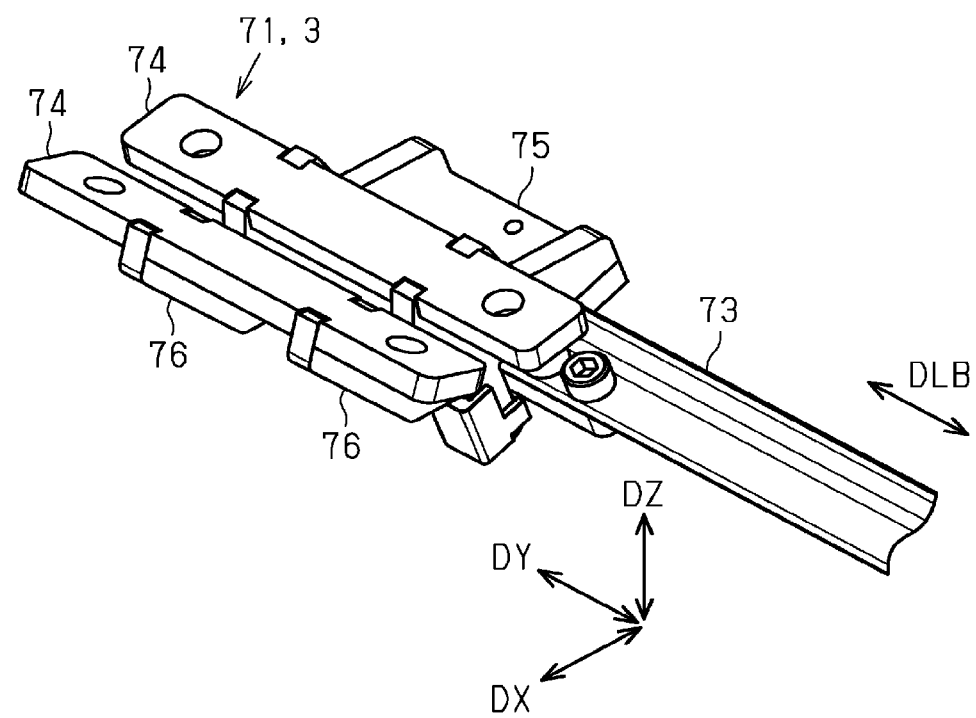
FIG. 21 is a perspective view of a first base in the vehicle step device of FIG. 15.

As illustrated in FIG. 21, the first base 71 includes two fixed portions 74 that are fixed to the rocker of the vehicle body 2, an arm support portion 75 that supports the first arm 81, and two coupling portions 76 that couple the two fixed portions 74 to the arm support portion 75. The two fixed portions 74 are arranged at an interval in the width direction DX. The two coupling portions 76 are arranged at an interval on front and rear sides. The two coupling portions 76 are coupled to lower surfaces of the two fixed portions 74. The arm support portion 75 is arranged in such a way as to reach the two coupling portions 76. The arm support portion 75 is fixed to lower portions of the two coupling portions 76.

The coupling bar 73 extends in the front-rear direction DY. A front end of the coupling bar 73 is joined to the first base 71. A rear end of the coupling bar 73 is joined to the second base 72. The coupling bar 73 is arranged between the first base 71 and the second base 72, and traverses from the first base 71 to the second base 72. For example, the coupling bar 73 is constituted by a metal member having an L-shaped section.

In the present embodiment, the coupling bar 73 supports the body portion 51 of the drive unit 6. The coupling bar 73 receives a reaction force when the drive unit 6 expands and contracts. A force applied to the coupling bar 73 is applied to the first base 71 and the second base 72. The drive unit 6 expands and contracts approximately along the front-rear direction DY. The coupling bar 73 extends in the front-rear direction DY. Thus, the reaction force when the drive unit 6 expands and contracts is applied in a longitudinal direction DLB of the coupling bar 73. Accordingly, a force perpendicular to the longitudinal direction DLB is unlikely to be applied to the coupling bar 73. For such a reason, the coupling bar 73 is unlikely to be bent. Thereby, the drive unit 6 can output a stable thrust or pulling force.

The structure of the first base 71 and the structure of the second base 72 are modified in such a way as to be adapted to a structure of the rocker. A length of the coupling bar 73 is modified in such a way as to be adapted to a vehicle type. Even in a case of different types of vehicles, the same base 3 can be applied to the vehicles having the same rocker structure. In such a manner, a combination of a structure of the first base 71, the second base 72, and the coupling bar 73 can constitute the base 3 suitable for each of various vehicles.

<Arm>

The first arm 81 is rotatably supported by the vehicle body 2 or the base 3 via the shaft member 10. The first arm 81 includes a base portion 91, an arm portion 92, and an extension portion 93. The extension portion 93 extends in a direction opposite to the arm portion 92 with respect to the base portion 91 (refer to FIG. 16). The extension portion 93 is coupled to the movement portion 52 of the drive unit 6.

The first arm 81 is supported by the first base 71. The base portion 91 of the first arm 81 is joined to the first base 71 via the shaft member 10. The first arm 81 rotates around a rotational axis CX of the shaft member 10.

The second arm 82 is rotatably supported by the vehicle body 2 or the base 3 via the shaft member 10. The second arm 82 includes a base portion 95 and an arm portion 96 (refer to FIG. 16). The second arm 82 is supported by the second base 72. The base portion 95 of the second arm 82 is joined to the second base 72 via the shaft member 10. The second arm 82 rotates around a rotational axis CY of the shaft member 10.

<Drive Unit>

As illustrated in FIG. 16, the drive unit 6 includes the expansion-contraction unit 50. The expansion-contraction unit 50 includes the body portion 51 and the movement portion 52 that moves relative to the body portion 51. The drive unit 6 has the same structure as that in the first embodiment. The motor 53 of the drive unit 6 is arranged inside the body portion 51. A center line of rotation of an output shaft of the motor 53 coincides with a rotational center of the spindle 55. The center line of rotation of the output shaft of the motor 53 is along a movement direction of the movement portion 52.

One of the body portion 51 and the movement portion 52 is coupled to the first arm 81 by a first coupling portion 101. The other of the body portion 51 and the movement portion 52 is coupled to the base 3 by a second coupling portion 102. The following describes a specific example.

A distal end portion of the movement portion 52 is rotatably attached to the extension portion 93 of the first arm 81. The distal end portion of the movement portion 52 is coupled to the extension portion 93 of the first arm 81 via the first coupling portion 101. The first coupling portion 101 couples the first arm 81 and the movement portion 52 to each other. In one example, the distal end portion of the movement portion 52 is coupled to the extension portion 93 of the first arm 81 via a ball joint 94. In the present embodiment, the ball joint 94 is included in the first coupling portion 101.

The body portion 51 is rotatably attached to the coupling bar 73. The body portion 51 is coupled to the coupling bar 73 via the second coupling portion 102. In one example, the body portion 51 is coupled to the coupling bar 73 via a ball joint 97. In the present embodiment, the ball joint 97 is included in the second coupling portion 102.

Figure 22:
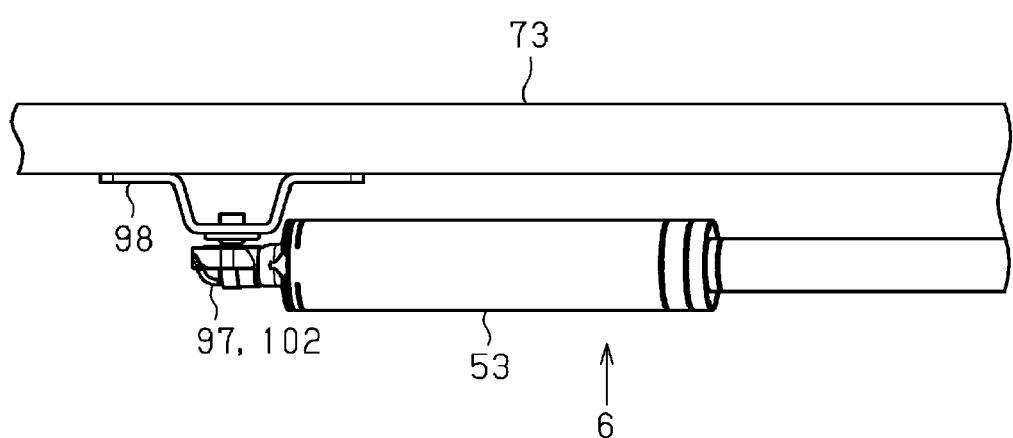
FIG. 22 is a side view of a drive unit and an attachment member in the vehicle step device of FIG. 15.

As illustrated in FIG. 22, the ball joint 97 is attached to the coupling bar 73 via an attachment member 98. The attachment member 98 is attached in such a way as to be detachable from the coupling bar 73. The attachment member 98 is attached to the coupling bar 73 by a screw, for example. The detachable attachment member 98 enables the body portion 51 to be detached from the coupling bar 73. This configuration is useful when the movement portion 52 of the drive unit 6 is stuck and movement of the step 5 thereby becomes difficult. For example, when the movement portion 52 of the drive unit 6 is stuck, the step 5 can be moved manually by detaching the body portion 51 from the coupling bar 73.

<Cable Arrangement>

Figure 23:
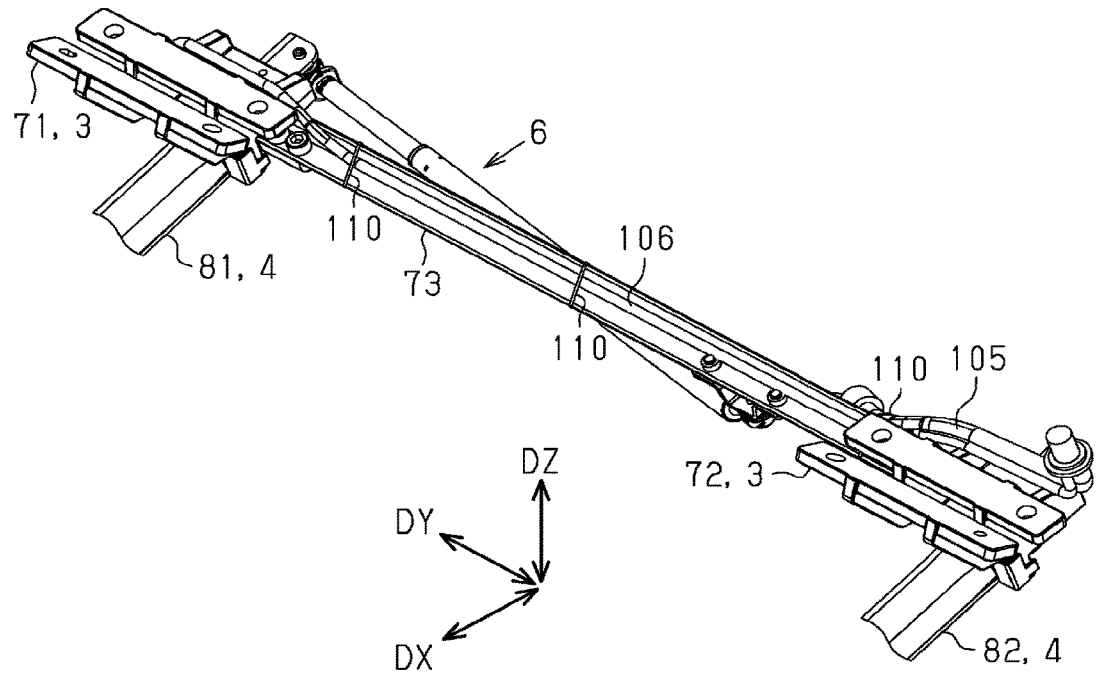
FIG. 23 is a perspective view illustrating arrangement of cables for the vehicle step device of FIG. 17.
Figure 24:
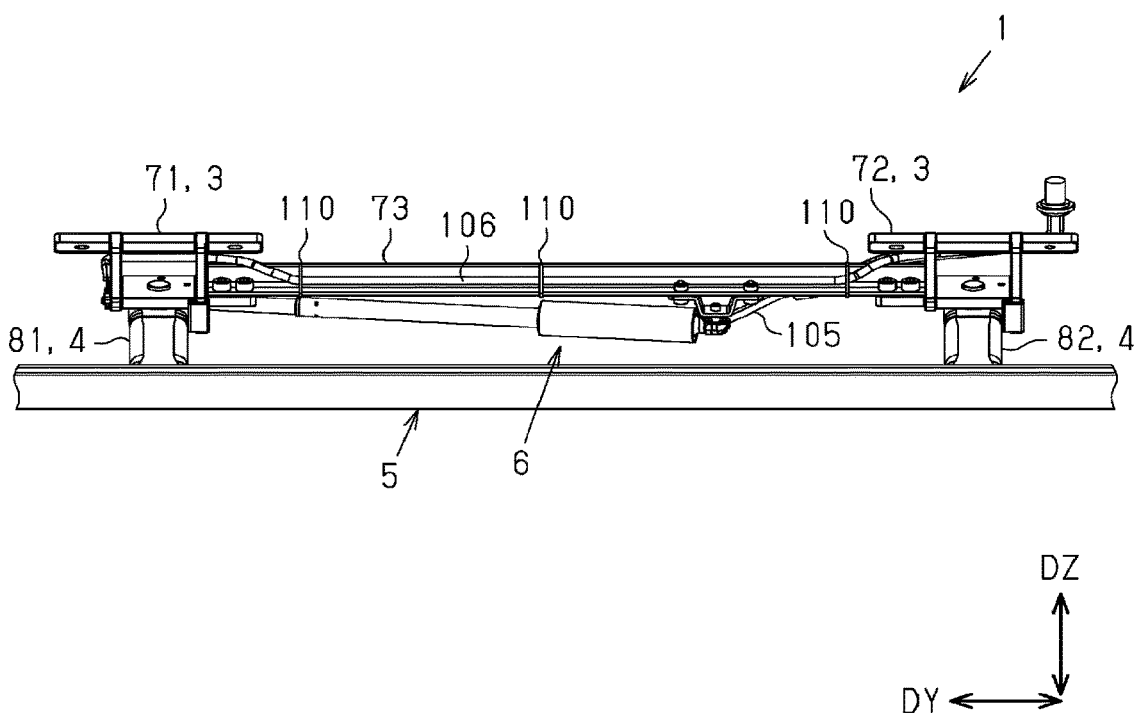
FIG. 24 is a side view illustrating the arrangement of the cables for the vehicle step device of FIG. 17.

FIG. 23 and FIG. 24 illustrate an example of arrangement of a first cable 105 and a second cable 106. The first cable 105 is connected to the drive unit 6. The first cable 105 includes a signal line and a power line. The second cable 106 is connected to a sensor (not illustrated). One example of the sensor detects a position of the first arm 81 when the step 5 is arranged at the deployed position. The sensor is attached to the first base 71.

The first cable 105 and the second cable 106 are arranged along the coupling bar 73. The first cable 105 and the second cable 106 are fixed to the coupling bar 73 by binding bands 110.

The binding band 110 that binds the first cable 105 and coupling bar 73 to each other not only fixes the first cable 105 to the coupling bar 73 but also achieves the following advantageous effect. In a case where the movement portion 52 of the drive unit 6 is stuck and movement of the step 5 thereby becomes difficult, when the body portion 51 is detached from the coupling bar 73, the binding band 110 indirectly supports the body portion 51. Specifically, when the body portion 51 is detached from the coupling bar 73, the body portion 51 falls down, but the body portion 51 is supported by the first cable 105 and hangs down. Since the first cable 105 is fixed to the coupling bar 73 by the binding band 110, the body portion 51 is suppressed from falling to the ground due to its own weight.

<Arrangement of Drive Unit>

Figure 25:
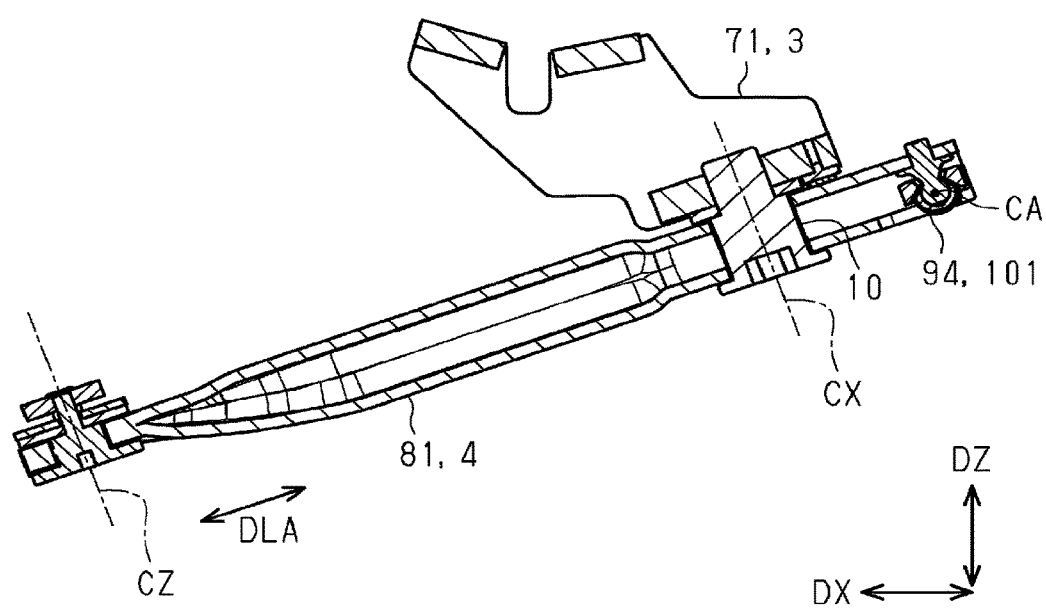
FIG. 25 is a sectional view taken along the 25-25 line for the vehicle step device of FIG. 15
Figure 26:
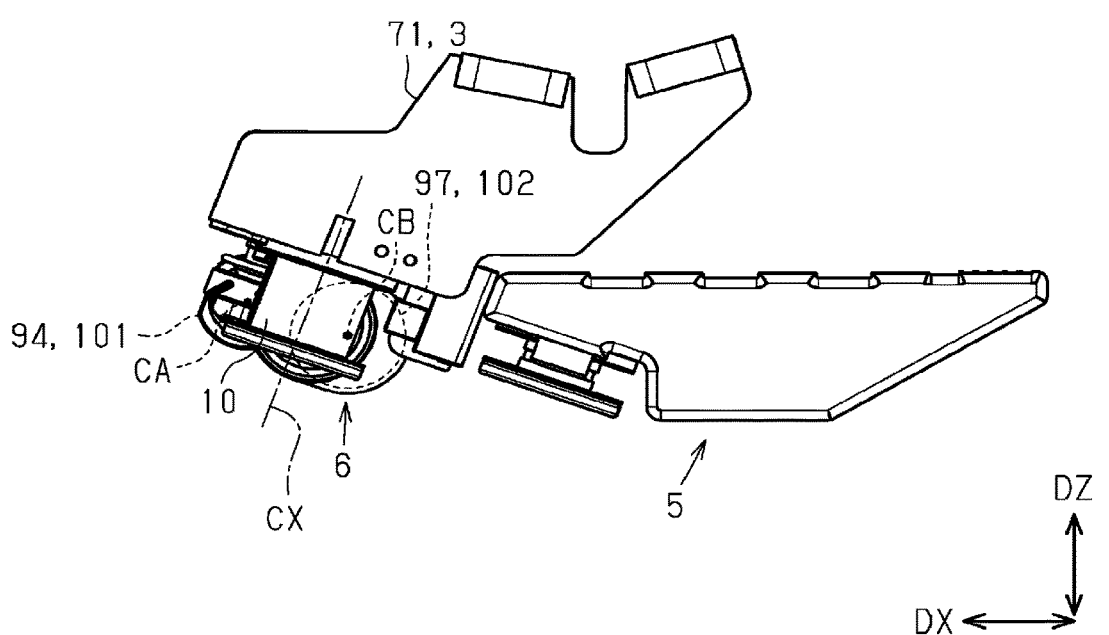
FIG. 26 is a front view of the vehicle step device of FIG. 17.

Arrangement of the drive unit 6 will be described with reference to FIG. 25 to FIG. 27. FIG. 25 omits an illustration of the step 5. FIG. 26 omits an illustration of the first arm 81.

As illustrated in FIG. 25, in a state where the step 5 is arranged at the deployed position, the first coupling portion 101 is arranged on an inner side of the rotational axis CX of the base portion 91 in the longitudinal direction DLA of the first arm 81.

As illustrated in FIG. 26, in a state where the step 5 is arranged at the retracted position, when the vehicle step device 1 is viewed from a front side or a rear side, at least a part of the first coupling portion 101 overlaps with the shaft member 10.

First Example

In one example, a first rotational center CA of the first coupling portion 101 is located on an inner side of the rotational axis CX of the base portion 91 of the first arm 81 in the width direction DX. In this case, a second rotational center CB of the second coupling portion 102 is arranged on an outer side of the first rotational center CA of the first coupling portion 101 in the width direction DX.

Alternatively, the first rotational center CA of the first coupling portion 101 may be located at the same position as the rotational axis CX of the base portion 91 of the first arm 81 in the width direction DX. Even in this case, the second rotational center CB of the second coupling portion 102 is arranged on an outer side of the first rotational center CA of the first coupling portion 101 in the width direction DX.

Figure 27:
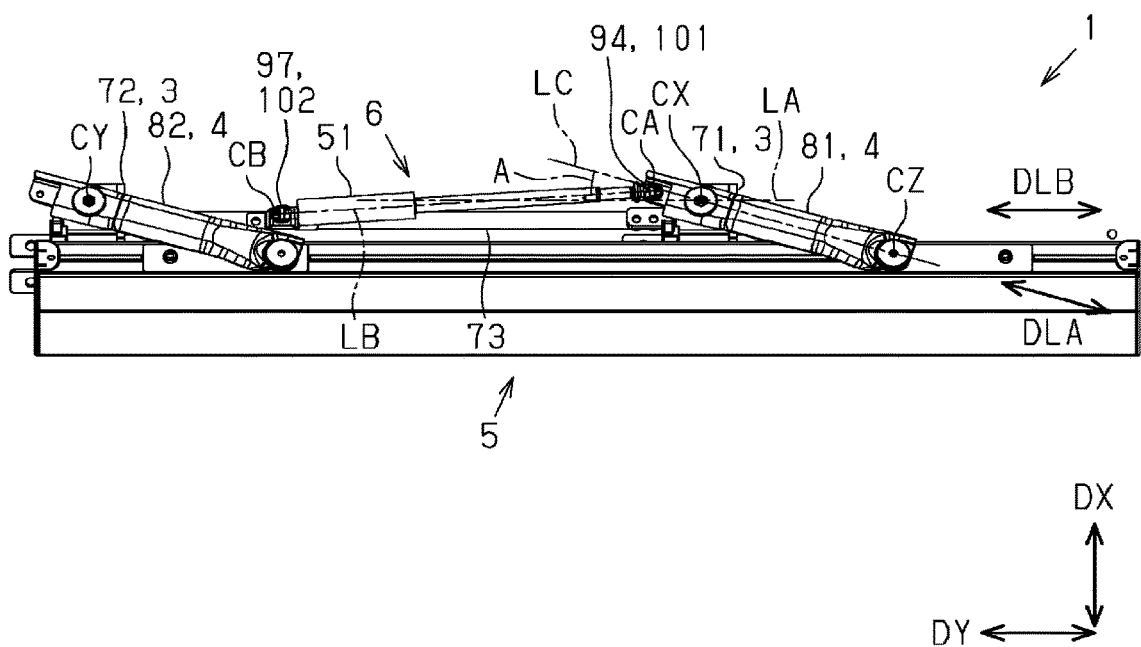
FIG. 27 is a bottom view of the vehicle step device of FIG. 17.

As illustrated in FIG. 27, in a state where the step 5 is arranged at the retracted position, the first coupling portion 101 and the second coupling portion 102 are arranged, in the width direction DX, between a rotational axis CZ of a part where the first arm 81 and the step 5 are coupled to each other and the rotational axis CY of the base portion 95 of the second arm 82.

In a state where the step 5 is arranged at the retracted position, the first coupling portion 101 and the second coupling portion 102 may be arranged, in the front-rear direction DY, between the rotational axis CX of the base portion 91 of the first arm 81 and the rotational axis CY of the base portion 95 of the second arm 82.

Second Example

As illustrated in FIG. 27, the drive unit 6 may be arranged in such a way as to satisfy the following requirement. The line LA passing through the rotational axis CX of the first arm 81 and extending in the front-rear direction DY is assumed. In a state where the step 5 is arranged at the retracted position, the first rotational center CA of the first coupling portion 101 is arranged at a first side of the line LA in the width direction DX. The second rotational center CB of the second coupling portion 102 is arranged on a second side of the line LA in the width direction DX. The first side of the line LA is one of an inner side and an outer side of the line LA in the width direction DX, and the second side of the line LA is the other of an inner side and an outer side of the line LA in the width direction DX.

In this case, in a state where the step 5 is arranged at the retracted position, when viewed from a front side or a rear side, at least one of the first coupling portion 101 and the second coupling portion 102 may overlap with the rotational axis CX of the base portion 91 of the first arm 81.

The vehicle step device 1 according to the present embodiment achieves the following advantageous effects.

(1) In a state where the step 5 is arranged at the retracted position, when the vehicle step device 1 is viewed from a front side or a rear side, at least a part of the first coupling portion 101 between the drive unit 6 and the first arm 81 overlaps with the shaft member 10.

According to this configuration, the vehicle step device 1 can be made compact in the width direction DX in a state where the step 5 is arranged at the retracted position. Thereby, in a state where the step 5 is arranged at the retracted position, the drive unit 6 and the first arm 81 are arranged at positions close to each other in the width direction DX. Thus, at the time of traveling of the vehicle, an influence on the vehicle step device 1 in response to rolling of the vehicle can be reduced. For example, in an example of the influence on the vehicle step device 1, an end of the vehicle step device 1 in the width direction DX hits the vehicle body 2, or a force acting in such a way as to twist the entire vehicle step device 1 increases. The rolling is defined as movement in a rotational direction along the circumference of a circle around a line along the front-rear direction DY.

(2) In addition to the above-described configuration (1), the first rotational center CA of the first coupling portion 101 is located on an inner side of the rotational axis CX of the base portion 91 of the first arm 81 in the width direction DX. In this case, the second rotational center CB of the second coupling portion 102 is arranged on an outer side of the first rotational center CA of the first coupling portion 101 in the width direction DX.

In addition to the above-described configuration (1), the first rotational center CA of the first coupling portion 101 may be located at the same position as the rotational axis CX of the base portion 91 of the first arm 81 in the width direction DX. In this case, the second rotational center CB of the second coupling portion 102 is arranged on an outer side of the first rotational center CA of the first coupling portion 101 in the width direction DX.

According to these configurations, the drive unit 6 can apply a force to the first arm 81 not in a direction along the longitudinal direction DLA of the first arm 81 but in a direction oblique to the first arm 81. Thereby, the first arm 81 can be smoothly rotated by the drive unit 6.

(3) In addition to the above-described configuration (1), in a state where the step 5 is arranged at the retracted position, the first coupling portion 101 and the second coupling portion 102 are arranged between the rotational axis CZ of the part where the first arm 81 and the step 5 are coupled to each other and the rotational axis CY of the base portion 95 of the second arm 82.

According to this configuration, the first coupling portion 101 and the second coupling portion 102 are located between the first arm 81 and the second arm 82, in a range in which the step 5 moves from the retracted position to the deployed position. Thus, during the movement of the step 5, the drive unit 6 is unlikely to hinder the movement of the step 5. Thereby, the movement of the step 5 is suppressed from being hindered.

(4) Aside from the above-described configuration (1), the vehicle step device 1 may have the following configuration. In a state where the step 5 is arranged at the retracted position, the first rotational center CA of the first coupling portion 101 is arranged on the first side of the line LA in the width direction DX. The second rotational center CB of the second coupling portion 102 is arranged on the second side of the line LA in the width direction DX.

In a reference example, in a state where the step 5 is arranged at the retracted position, both of the first rotational center CA of the first coupling portion 101 and the second rotational center CB of the second coupling portion 102 may be arranged on the first side of the line LA in the width direction DX. However, in this case, an angle A (refer to FIG. 27) between the line LC along the longitudinal direction DLA of the first arm 81 and the line LB along a direction of a force applied to the first arm 81 by the drive unit 6 is not easily made larger.

In this regard, according to the above-described configuration, in a state where the step 5 is arranged at the retracted position, an angle A between the line LC along the longitudinal direction DLA of the first arm 81 and the line LB along a direction of a force applied to the first arm 81 by the drive unit 6 can be made larger (refer to FIG. 27). Thus, at the initial movement when the step 5 starts to be moved from the retracted position, the step 5 can be moved smoothly.

(5) In addition to the above-described configuration (4), in a state where the step 5 is arranged at the retracted position, when viewed from a front side or a rear side, at least one of the first coupling portion 101 and the second coupling portion 102 overlaps with the rotational axis CX of the base portion 91 of the first arm 81. According to this configuration, the vehicle step device 1 can be made compact in the width direction DX.

Other Modified Examples

The second embodiment is not limited to the above-described configuration examples. The above-described embodiment can be modified as in the following. In the following modified examples, constituents that are not substantially modified from the constituents in the above-described embodiment are described while being denoted by the same reference signs as those of the constituents in the above-described embodiment.

In the second embodiment, the first rotational center CA of the first coupling portion 101 may be arranged as follows.

Figure 28:
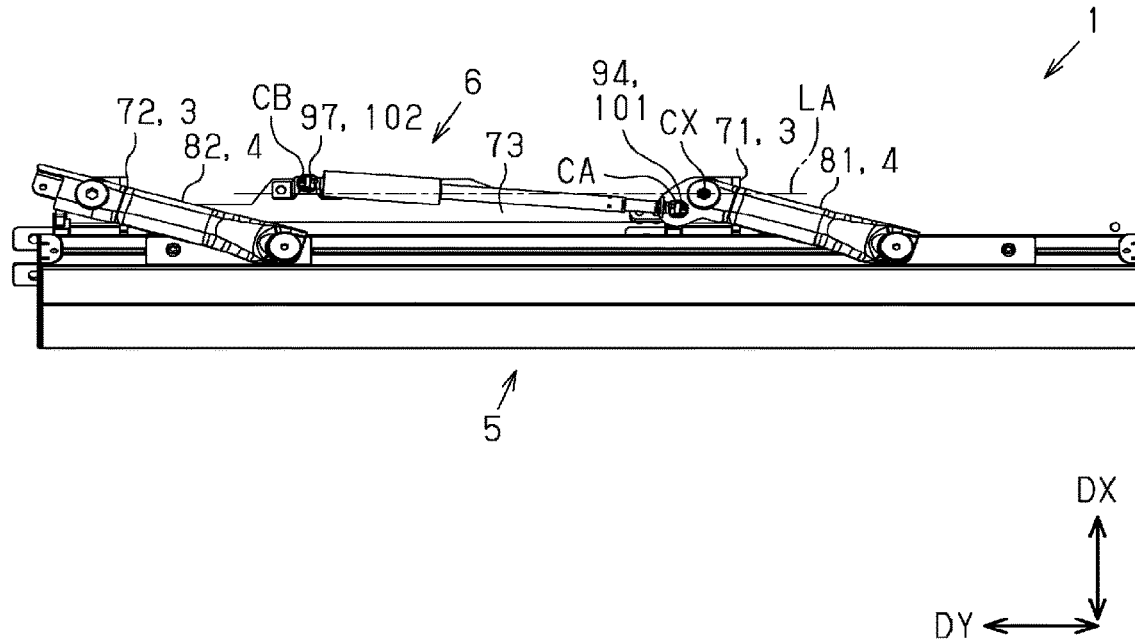
FIG. 28 is a bottom view of the vehicle step device according to a modified example.

In one example, as illustrated in FIG. 28, the first rotational center CA of the first coupling portion 101 may be located on an outer side of the rotational axis CX of the base portion 91 of the first arm 81 in the width direction DX. In this case, the second rotational center CB of the second coupling portion 102 is arranged on an inner side of the first rotational center CA of the first coupling portion 101 in the width direction DX.

In another example, the first rotational center CA of the first coupling portion 101 may be located at the same position as the rotational axis CX of the base portion 91 of the first arm 81 in the width direction DX. In this case, the second rotational center CB of the second coupling portion 102 is arranged on an inner side of the first rotational center CA of the first coupling portion 101 in the width direction DX.

The invention claimed is:

1. A vehicle step device to be provided at a vehicle body, the vehicle step device comprising:

an arm attached to the vehicle body or a base fixed to the vehicle body;

a step attached to the arm; and a drive unit configured in such a way as to drive the arm, wherein the drive unit includes an expansion-contraction unit, the expansion-contraction unit includes a body portion and a movement portion configured in such a way as to move relative to the body portion, and, in a state where the vehicle step device is attached to the vehicle body, the movement portion is connected to the arm in such a way that the expansion-contraction unit expands and contracts in a front-rear direction of the vehicle body;

wherein the arm is rotatably supported by the vehicle body or the base via a shaft member, one of the body portion and the movement portion in the drive unit is coupled to the arm by a first coupling portion, another of the body portion and the movement portion in the drive unit is coupled to the base by a second coupling portion, and, in a state where the step is arranged at a retracted position, when the vehicle step device is viewed from a front side or a rear side, at least a part of a coupling portion coupling the drive unit and the arm to each other overlaps with the shaft member; and wherein a first rotational center of the first coupling portion is located at a same position as a rotational axis of a base portion of the arm in a width direction, or is located on an inner side of the rotational axis of the base portion of the arm in the width direction, and a second rotational center of the second coupling portion is located on an outer side of the first rotational center of the first coupling portion in the width direction, or a first rotational center of the first coupling portion is located at a same position as a rotational axis of a base portion of the arm in a width direction, or is located on an outer side of the rotational axis of the base portion of the arm in the width direction, and a second rotational center of the second coupling portion is located on an inner side of the first rotational center of the first coupling portion in the width direction.

2. The vehicle step device according to claim 1, wherein the body portion includes: a spindle configured in such a way as to be rotated by a motor; a nut engaging with the spindle; and an outer cylinder configured in such a way as to guide the nut, the nut is configured in such a way as to move along the spindle by rotation of the spindle, and the movement portion is configured in such a way as to move together with the nut.

3. The vehicle step device according to claim 2, wherein the spindle of the expansion-contraction unit is arranged in such a way as to be along the front-rear direction of the vehicle body, in an attached state where the vehicle step device is attached to the vehicle body or the base.

4. The vehicle step device according to claim 1, wherein the body portion of the expansion-contraction unit is detachably attached to the vehicle body or the base by a screw.

5. The vehicle step device according to claim 1, wherein the body portion of the expansion-contraction unit is rotatably attached to the vehicle body or the base.

6. The vehicle step device according to claim 1, wherein the arm includes: a base portion supported by the vehicle body or the base; an arm portion extending from the base portion toward the step; and an extension portion extending in a direction opposite to the arm portion at the base portion, and a distal end portion of the movement portion of the expansion-contraction unit is rotatably attached to the extension portion.

7. The vehicle step device according to claim 5, wherein the arm includes: a base portion supported by the vehicle body or the base; an arm portion extending from the base portion toward the step; and an extension portion extending in a direction opposite to the arm portion at the base portion, and a distal end portion of the movement portion of the expansion-contraction unit is rotatably attached to the extension portion.

8. The vehicle step device according to claim 1, further comprising a reception member receiving the expansion-contraction unit, wherein the reception member is arranged under the expansion-contraction unit in an attached state where the vehicle step device is attached to the vehicle body or the base.

9. The vehicle step device according to claim 1, wherein the body portion of the expansion-contraction unit is connected directly or indirectly to the vehicle body, and the movement portion of the expansion-contraction unit is connected to the arm.

10. The vehicle step device according to claim 1, further comprising:

a second arm in addition to a first arm as the arm, wherein the step is supported by the first arm and the second arm, and, in a state where the step is arranged at a retracted position, the first coupling portion and the second coupling portion are arranged between a rotational axis of a part where the first arm and the step are coupled to each other and a rotational axis of a base portion of the second arm.

11. The vehicle step device according to claim 1, wherein one of the body portion and the movement portion in the drive unit is coupled to the arm by the first coupling portion, another of the body portion and the movement portion in the drive unit is coupled to the base by the second coupling portion, and, in the state where the step is arranged at the retracted position, the first rotational center of the first coupling portion is arranged, in the width direction, on a first side of a line passing through a rotational axis of the arm and extending in the front-rear direction, and the second rotational center of the second coupling portion is arranged, in the width direction, on a second side of the line.

12. The vehicle step device according to claim 11, wherein, in the state where the step is arranged at the retracted position, when viewed from the front side or the rear side, at least one of the first coupling portion and the second coupling portion overlaps with the rotational axis of a base portion of the arm.

\* \* \* \* \*